United States Patent [19]

Inoue et al.

[11] Patent Number: 4,707,104
[45] Date of Patent: Nov. 17, 1987

[54] CAMERA HAVING MOTOR-DRIVEN FILM WIND AND REWIND SYSTEM

[75] Inventors: Manabu Inoue, Kobe; Akihiko Fujino, Sakai; Masayasu Hirano, Nishinomiya; Masaaki Nakai; Fumio Yoshida, both of Kawachinagano, all of Japan

[73] Assignee: Minolta Camera Kabushiki Kaisha, Osaka, Japan

[21] Appl. No.: 802,746

[22] Filed: Nov. 29, 1985

[30] Foreign Application Priority Data

Nov. 30, 1984 [JP] Japan ............................ 59-182704[U]
Dec. 12, 1984 [JP] Japan ............................ 59-188613[U]
Dec. 12, 1984 [JP] Japan ............................ 59-188614[U]
Dec. 13, 1984 [JP] Japan ............................ 59-189024[U]

[51] Int. Cl.⁴ ............................ G03B 1/18; G03B 7/26
[52] U.S. Cl. ................................... 354/412; 354/484; 354/173.11
[58] Field of Search ..................... 354/412, 484, 173.1, 354/173.11

[56] References Cited

U.S. PATENT DOCUMENTS 4,572,637 2/1986 Inoue .............................. 354/173.11

Primary Examiner—W. B. Perkey
Attorney, Agent, or Firm—Burns, Doane, Swecker & Mathis

[57] ABSTRACT

A motor-driven camera comprising a film winding and rewinding mechanism operable by a starter switch, and a low power consumption type memory unit. The film winding and rewinding mechanism include a transmission changeover gear. For sliding this gear a motor is rotated backward once to eliminate a contact between teeth of the changeover gear and a drive gear operatively connected to the motor. The memory unit includes a flip-flop memory circuit and a switching circuit. The memory circuit shifts from a first state to a second state and remains in the second state when the starter switch is closed. In the second state the memory circuit outputs an operation signal to a transmission mechanism control unit, and returns to the first state upon receipt of a signal output by the control unit when an operation is completed. The switching circuit performs a positive feedback function with respect to the closure of the starter switch.

6 Claims, 21 Drawing Figures

CAMERA HAVING MOTOR-DRIVEN FILM WIND AND REWIND SYSTEM

BACKGROUND OF THE INVENTION

1. Field of the Invention

The present invention relates to an electronically controlled camera having a motor-driven film wind and rewind system, and more particularly to a camera having a memory unit for example, for storing a starter signal for causing its electronic control system to perform a predetermined operation.

2. Description of the Prior Art

With a known camera having a film wind and rewind system as noted above, in rewinding a film after the film has been wound to the end and a motor has stopped, a transmission changeover gear is caused to slide by a transmission changeover mechanism with the motor standing still, thereby to change a transmission system engaged by the changeover gear from a wind side to a rewind side.

However, a drive gear and the transmission changeover gear are in engagement with each other having respective teeth in contact when the film winding is completed. If the transmission system is switched in that state, the transmission changeover gear is moved through sliding contact with the drive gear and the resulting sliding resistance tends to impair a smooth switching of the transmission system.

Furthermore, well-known means for interrupting a picture taking action after the film has been wound to the end in the conventional camera comprises means to mechanically lock a pressure of a shutter release button when the end of the film is wound up, or means to detect an increase in resistance to the film winding at the end of the film to interrupt a shutter release operation.

However, although the above conventional means is effective to prevent a picture taking action, there is a problem in applying such means as it is to a camera having a light measuring device. That is, the light measuring device generally is operable in interlocked relationship with the shutter release button or a film winding device. Therefore, in the latter case where just the shutter release operation effected with the shutter release button is interrupted, the light measuring device will operate although the film has been wound to the end. This results in wasteful power consumption and an early exhaustion of batteries. On the other hand, the former case where the shutter release button is mechanically locked requires a mechanism for locking the shutter release button and an interlocking mechanism to enable a locking operation.

Furthermore, a known memory unit for the electronic control system in the conventional camera comprises operation means for performing a predetermined operation, a starter switch for starting the operation means, and memory means operable in response to closure of the starter switch to shift from a first state to a second state and remain in the second state, to output an operation signal to the operation means while in the second state, and to return to the first state in response to a signal output by the operation means at the end of its operation.

The principle of this conventional memory unit is, for example, as shown in FIG. 15A of the accompanying drawings. In this example, a starter switch S' for starting operation means C' is connected to a set input terminal S of a flip-flop FF' which is one example of memory means. This flip-flop FF' is set by closure of the starter switch S'. That is to say the flip-flop FF' shifts from the first state to the second state. The flip-flop FF' has an output terminal Q connected to the operation means C', and the operation means C' operates in response to a signal output from the output terminal Q in the set state. An output terminal of this operation means C' is connected to a reset input terminal R of the flip-flop FF'. The flip-flop FF' is reset upon receipt of a signal output from the operation means C' at the end of its operation. That is to say the flip-flop FF' returns to the first state.

Such a prior art construction as above, however, is prone to the following problems and has room for improvement.

When the starter switch S' is closed, an electric current flows through this switch S'. The current continues to flow through the switch S' while the switch S' is closed. Therefore, power tends to be consumed to a wasteful degree even though the operation means C' is operable only by setting the flip-flop FF' which is one example of memory means.

Particularly with a battery-operated camera or other instruments, battery sizes are often limited in the interest of compact designing. Since battery capacity is also limited, wasteful power consumption as noted above results in early exhaustion of the batteries.

Another example of known memory unit has the memory means shiftable from the first state to the second state by closure of a set switch, and further comprises output means operable in response to an operation permit signal resulting from closure of the starter switch after opening of the set switch to output an operation signal to cause the operation means to perform the predetermined function.

Such a memory unit is constructed as shown in FIG. 15B.

In this example, a set switch S' for starting operation means C' is connected to the set input terminal S of the flip-flop FF' which is one example of memory means, and an AND gate AN' which is one example of output means receives a signal indicating the state of the set switch S', a signal indicating the state of the starter switch E' and an output signal from the flip-flop FF'. IN1' and IN2' in the drawing denote inverters provided for conformity of the logic.

This flip-flop FF' is set by closure of the set switch S' and its output signal changes to "H" level. In other words, the flip-flop FF' shifts from the first state to the second state and outputs an operation permit signal. If in this state the starter switch E' is open, the operation means C' will not operate yet. When the set switch S' is opened, the signal indicating the state of this switch S' changes to "H" level. The input to the flip-flop FF' changes to "L" level but its output remains in "H" level. When in this state the starter switch E' is closed, all the inputs to the AND gate AN' change to "H" level and the operation signal is output to the operation means C' whereby the predetermined operation is carried out.

An output terminal of this operation means C' is connected to a reset input terminal R of the flip-flop FF'. The flip-flop FF' is reset upon receipt of a signal output from the operation means C' at the end of its operation. That is to say the flip-flop FF' returns to the first state.

However, the above prior art construction is prone to the following problem as is the preceding example, and there is room for improvement.

That is to say, when the set switch S' is closed, an electric current flows through this switch S'. The current continues to flow through the switch S' while the switch S' is closed, and hence a great power consumption.

Furthermore, such a memory unit memorizes the closure of the set switch S' even when the starter switch E' is open, and the predetermined operation is carried out only when the set switch S' is closed and then opened and in that state the starter switch E' is closed. Therefore, the set switch could inadvertently be kept closed over a long period of time. As a result power could be consumed to an wasteful extent during this time. Thus, this prior art construction, like the preceding example, is unsuitable for a camera or the like instruments.

SUMMARY OF THE INVENTION

A primary object of the present invention is to provide a camera having a motor-driven film wind and rewind system, which is compact and highly reliable.

Another object of the present invention is to provide a camera capable of smooth switching of a transmission mechanism between a film winding position and a film rewinding position.

A further object of the invention is to provide a camera wherein means for interrupting a picture taking action after a film is wound to an end requires no mechanical device and consumes little power.

A still further object of the invention is to provide a camera wherein a minimal electric current occurs at its electronic control system when a starter switch is closed.

A still further object of the invention is to provide a camera wherein a minimal electric current occurs at its electronic control system when a set switch is closed and wherein operation means is controllable to perform a predetermined operation, after the closure of the set switch, only when the starter switch is closed and the set switch is opened.

Other objects and advantages of the present invention will be apparent from the following description.

DESCRIPTION OF THE PREFERRED EMBODIMENT

An embodiment of the present invention will be described hereinafter with reference to the drawings.

Figure 1:
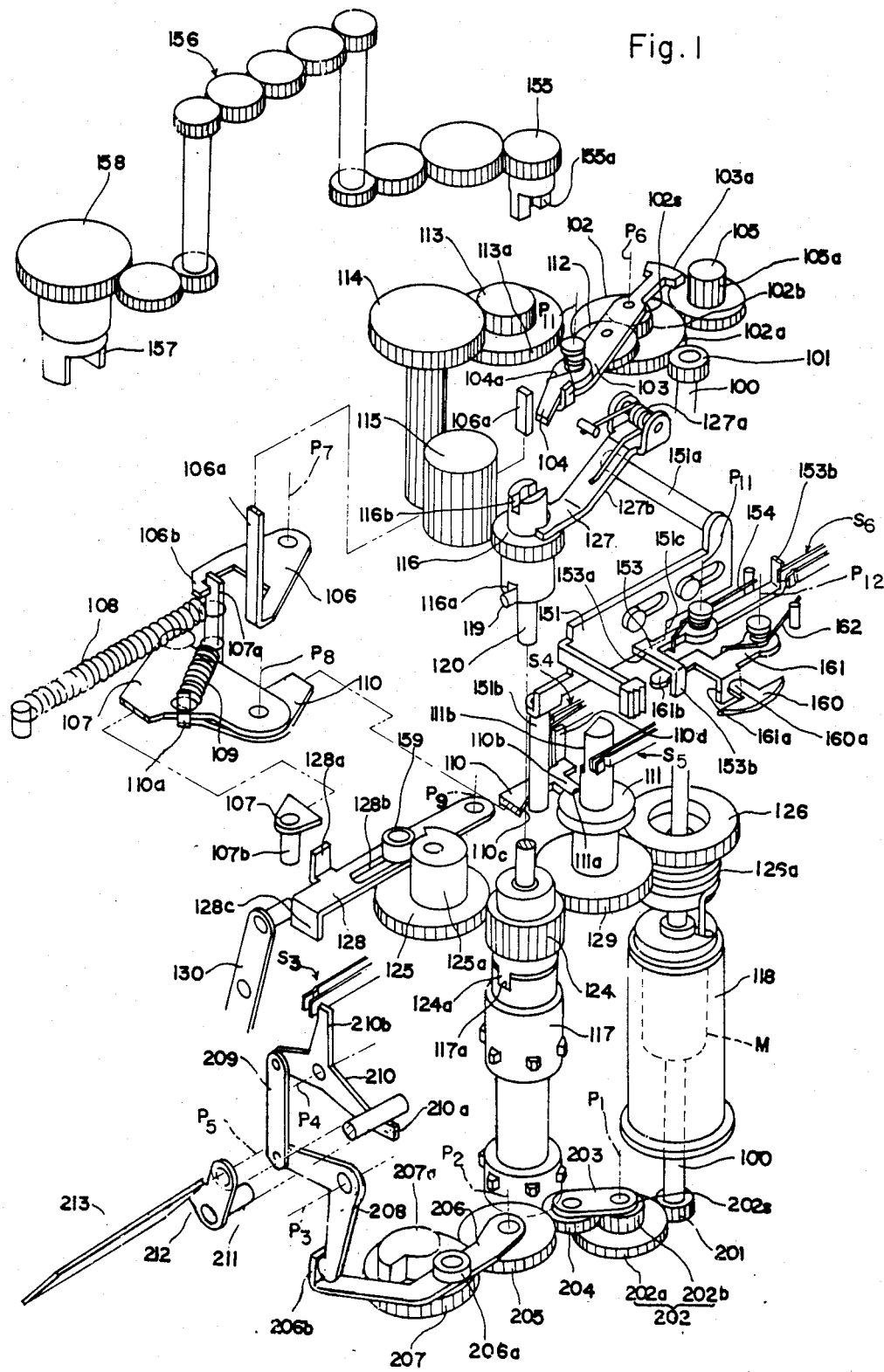
FIG. 1 is a schematic view of a motor-driven film wind and rewind system mounted in a camera according to the present invention.

FIG. 1 schematically shows a motor-driven film winding and rewinding system mounted in a camera.

A shutter release step in picture taking will be described first.

A gear 201 operatively connected to a motor shaft 100 is in engagement with a large gear portion 202a of a gear 202. A small gear portion 202b of the gear 202 is in engagement with a planet gear 204 supported by a forward end of a carrier 203 pivotable on an axis P1 of the gear 202. The planet gear 204 is opposed to a drive gear 205, and is out of engagement with the drive gear 205 before a shutter release or when a film wind has completed. The drawing shows a state in which a motor M has started rotating clockwise and the two gears 204 and 205 are engaged with each other. More particularly, when the gear 201 rotates, the gear 202 starts rotating counterclockwise and the planet gear carrier 203 in frictional engagement with a top surface 202a of the gear 202 also starts pivoting counterclockwise thereby bringing the planet gear 204 rotating clockwise into engagement with the gear 205. The gear 205 is in engagement with a mirror lift gear 207 integrally formed with a mirror lift cam 207a so that with the counterclockwise rotation of the gear 205 the cam 207a rotates clockwise. At this time a cam surface of the cam 207a engages a contact portion 206a of a mirror lift lever 206 mounted to be pivotable on an axis P2 of the gear 205, thereby causing the lever 206 to pivot counterclockwise.

The lever 206 is operatively connected through a lever 208 pivotable on an axis P3 and a link 209 to a lever 210 pivotable on an axis P4. The counterclockwise pivoting of the lever 206, through a bend portion 206b at an end thereof, causes the lever 208 to pivot couterclockwise, which in turn causes a first arm 210a of the lever 210 to pivot counterclockwise pushing a mirror lift pin 211 upward in the drawing. This pin 211 is secured to a mirror support 212 carrying a mirror 213 and pivotable on an axis P5. As the pin 211 is moved upward, the mirror 213 pivots clockwise about the axis P5 to move upward. The lever 210 has a second arm 210b opposed to a microswitch S3 and pivotable counterclockwise with the lifting of the mirror 213 to close this switch S3 and thereby to stop the motor M. The lever 208, lever 210 and mirror support 212 are spring-loaded toward positions to maintain the mirror 213 in a down position, respectively.

A film winding step in picture taking will be described next.

After the mirror 213 is lifted, a first and a second blades of a shutter, not shown, make a snapping run and thereafter the motor M starts rotating counterclockwise. A gear 101 operatively connected to the motor shaft 100 is in engagement with a large gear portion 102a of a reduction gear 102. A small gear portion 102b of the reduction gear 102 is in engagement with a planet gear 112 supported by a wind stop release sector 103 pivotable on an axis P6 of the gear 102. The planet gear 112 is opposed to a large gear portion 113a of a reduction gear 113 and remains out of engagement therewith immediately after the snapping run of the shutter blades.

The wind stop release sector 103 includes a gear portion 103a opposite a portion thereof carrying the planet gear 112 across the axis P6. This gear portion 103a is opposed to a small gear portion 105a of a release drive gear 105 operatively connected to the reduction gear 102, and is also not in engagement with the small gear portion 105a immediately after the snapping run of the shutter blades.

With the counterclockwise rotation of the motor M, the gear 102 rotates clockwise and the wind stop release sector 103 in frictional engagement with a top surface of the gear 102 also starts pivoting clockwise. Then its gear portion 103a comes into engagement with the small gear portion 105a of the release drive gear 105. As the sector 103 is driven to pivot clockwise, a wind stop release lever 104 attached to an extreme end of the sector 103 pivots clockwise about the axis P6 in unison with the sector 103 and abuts against an aperture diaphragm return stop lever 106. This stop lever 106 is mounted to be pivotable on an axis P7 and urged by a spring, not shown, in the counterclockwise direction. The stop lever 106 has a first arm 106a opposed to the stop release lever 104 and a second arm 106b engaging an upstanding portion 107a of an aperture diaphragm return lever 107. The lever 107 is mounted to be pivotable on an axis P8 and urged by a spring 108 in the counterclockwise direction, namely toward a position to release itself from the engagement by the stop lever 106.

A wind stop lever 110 is mounted to be pivotable on the axis P8 in unison with the return lever 107 when the return lever 107 is out of engagement with the stop lever 106, the lever 110 being pivotable by a force of a spring 109 extending between an upstanding portion 110a of the lever 110 and the upstanding portion 107a of the return lever 107. The wind stop lever 110 defines a projection 110b engageable with a cutout 111a of a wind stop can 111 operatively connected to a sprocket gear 124 and a spool gear 126.

As the wind stop release lever 104 pivots clockwise and abuts against the return stop lever 106, the stop lever 106 pivots clockwise releasing the aperture diaphragm return lever 107. The diaphragm return lever 107 and the wind stop lever 110 pivot counterclockwise in unison under the urging force of the spring 108, and the projection 110b of the wind stop lever 110 disengages from the cutout 11a of the wind stop cam 111. That is to say, in this state a sprocket 117 and a spool 118 are both rotatable. The wind stop lever 110 includes a bend portion 110d opposed to a microswitch S4 so that the microswitch S4 is closed by the counterclockwise pivoting of the wind stop lever 110.

Subsequently, the wind stop release sector 103 is driven by the release drive gear 105 to pivot further in the clockwise direction whereby the gear portion 103a disengages from the drive gear 105. However, the wind stop release sector 103 keeps rotating clockwise thereafter by virtue of its frictional engagement with the top surface 102a of the gear 102 whereby the planet gear 112 engages the large gear portion 113a of the reduction gear 113. At this time the wind stop release level 104 and the aperture diaphragm return stop lever 106 which have different loci of pivoting are out of abutment, and the stop lever 106 has pivoted in the counterclockwise direction back to an initial position by the urging force of a spring not shown.

The reduction gear 113 is operatively connected through gears 114 and 115 to a transmission changeover gear 116. The transmission changeover gear 116 starts rotating counterclockwise when the planet gear 112 rotating counterclockwise engages the large gear portion 113a of the reduction gear 113. The changeover gear 116 defines a first groove 116a in engagement with a horizontal pin 119 formed on a sprocket shaft 120 whereby drive is transmitted to the sprocket 117 and sprocket gear 124 operatively connected to the sprocket shaft 120. The sprocket gear 124 is in engagement with a wind stop gear 129 but, since the wind stop cam 111 is released from the engagement by the projection 110a of the wind stop level 110, rotates counterclockwise causing counterclockwise rotation of the spool gear 126 through the wind stop gear 129. The spool gear 126 is operatively connected through a spool friction spring 126a to the spool 118. The sprocket shaft 120, sprocket gear 117, wind stop gear 129 and spool gear 126 constitute film winding means, and by rotating counterclockwise the spool 118 and sprocket 117 advance a film.

Figure 2A:
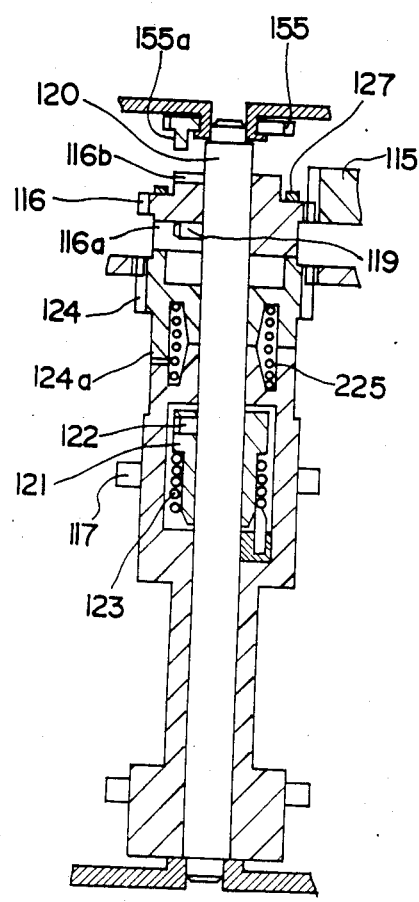
FIG. 2A is a cross sectional view of a sprocket shaft in a film winding position.
Figure 2B:
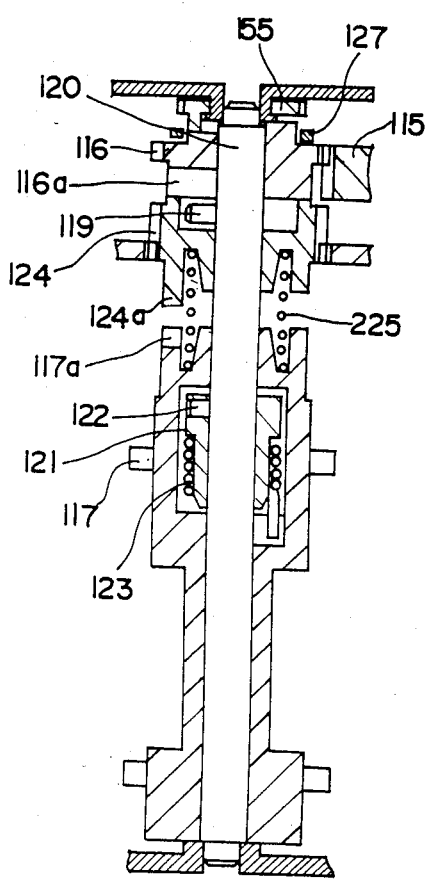
FIG. 2B is a cross sectional view of the sprocket shaft in a film rewinding position.

Referring to FIGS. 2a and 2b, the sprocket shaft 120 and a sprocket friction sleeve 121 are rigidly connected to each other by a pin 122 to be rotatable in unison. A friction spring 123 secured to the sprocket 117 is mounted between the sprocket friction sleeve 121 and the sprocket 117. This arrangement permits the sprocket shaft 120 and the sprocket 117 to rotate in unison when a load acting on the sprocket 117 is below a predetermined value, and permits the sprocket friction sleeve 121 and the friction spring 123 to rotate idly when the load acting on the sprocket 117 exceeds the predetermined value. In other words, this arrangement is effective to prevent perforations in the film from becoming torn or the film from coming off a cartridge when the sprocket 117 is forcibly driven by the motor M upon completion of the film advance. Further, the above arrangement assists film end detector means which judges that the film is at the end from incompletion of the film winding within a predetermined time indicated by the above idle rotation.

The sprocket gear 124 includes a clutch projection 124a engageable with a clutch recess 117a defined in the sprocket 117. The sprocket 117 and the sprocket gear 124 are operatively connected to each other as shown in FIG. 2a when the clutch recess and projection 117a and 124a are in engagement against the urging force of a spring 225 mounted therebetween. A force overcoming the urging force of this spring 225 is provided by a spring 127a urging a changeover fork 127 downwardly. The changeover fork 127 has an extreme end thereof abutting on a top surface of the transmission changeover gear 116, and moves upward as shown in FIG. 2b against the urging force of the spring 127a only during a film rewinding step described later, permitting the transmission changeover gear 116 and the sprocket gear 124 to move upward under the urging force of the spring 225. This construction constitutes connection switching means selectively switchable between a film winding position to connect the drive means, i.e. the motor M, to the film wind means and a film rewinding position to connect the drive means to the film rewind means.

The sprocket gear 124 is also in engagement with a shutter charge gear 125 integrally formed with a shutter charge cam 125a. The shutter charge gear 125 is equal in the number of teeth to the aforesaid wind stop gear 129, and the two gears 125 and 129 make one rotation with one cycle of picture taking, respectively. The shutter charge cam 125a is opposed to a roller 159 mounted in a slot 128b defined in a shutter charge lever 128 pivotable on an axis P9, the roller 159 being urged toward the axis P9 by a spring not shown. When the sprocket gear 124 rotates counterclockwise, the shutter charge gear 125 rotates clockwise with the shutter charge cam 125a rotating clockwise. The cam 125a thereby engages the roller 159 causing the shutter charge lever 128 to pivot clockwise.

The shutter charge lever 128 includes a bend portion 128a opposed to a pin 107b extending from the aperture diaphragm return lever 107, and a bend portion 128c opposed to a lever 130 operatively connected to the shutter not shown. By rotating clockwise the shutter charge lever 128 charges the shutter through the lever 130 and at the same time causes the return lever 107 to pivot clockwise placing the upstanding portion 107a in engagement with the second arm 106b of the aperture diaphragm return stop lever 106.

As the aperture diaphragm return lever 107 rotates clockwise, the wind stop lever 110 also rotates clockwise together therewith whereby the projection 110b of the wind stop lever 110 engages the cutout 111a of the wind stop cam 111 which has made one rotation upon completion of the shutter charging. At this time the microswitch S4 is opened and the motor M is stopped thereby. This completes the film winding and shutter charging.

The described drive system for film winding returns to a pre-winding state upon a shutter release operation.

More particularly, when the motor M rotates clockwise during the release step, the reduction gear 102 is driven by the gear 101 to rotate counterclockwise. Then the wind stop release sector 103 also pivots counterclockwise by virtue of its frictional contact with the top surface 102s of the reduction gear 102 whereby the planet gear 112 disengages from the large gear portion 113a of the reduction gear 113. Subsequently the gear portion 103a of the wind stop release sector 103 engages the release drive gear 105, and the sector 103 is then driven by the gear 105 to pivot further in the counterclockwise direction.

The wind stop release lever 104 is attached to the extreme end of the wind stop release sector 103 to be pivotable about an axis P10 only in the clockwise direction by the action of a spring 104a. With the counterclockwise pivoting of the wind stop release sector 103, the lever 104 rotates clockwise by its abutment on the aperture diaphragm return lever 106 and the sector 103 rides over the return lever 106. When the gear portion 103a of the sector 103 disengages from the release drive gear 105, the sector 103 is driven again by its frictional contact with the top surface of the gear 102 to pivot counterclockwise and return to the initial position.

The mirror 213 is lowered in parallel with the film winding, as follows:

When the motor M rotates counterclockwise for winding the film, the gear 202 is driven by the gear 201 to rotate clockwise. The carrier 203 then pivots clockwise by virtue of its frictional contact with the top surface of the gear 202, which disengages the planet gear 204 from the transmission gear 205. The mirror lift gear 207 is urged in the counterclockwise direction by a spring not shown. Since the transmission gear 205 with which the mirror lift gear 207 is in engagement is no longer operatively connected to the motor shaft 100, the mirror lift cam 207a rotates back in the counterclockwise direction. As this takes place, the lever 208 and lever 210 spring-loaded toward the positions to lower the mirror 312 pivot clockwise, respectively, and the mirror 212 also spring-loaded toward the position to lower the mirror 312 pivots counterclockwise, thereby lowering the mirror 312.

Picture taking for for one frame of the film is completed by carrying out the release step and the film winding step as described above.

A film rewind step carried out after repeating the picture taking will be described next.

When the film comes to an end and stops, the sprocket 117 and the spool 118 stop. In this state the load acting on the sprocket 117 exceeds the predetermined value, and the sprocket friction sleeve 121 and the friction spring 123 rotate idly as hereinbefore described. And if this state continues a predetermined period of time, an interrupt takes place in a control system, as described later, to stop the motor M and be ready for the film rewinding step.

The film rewind is carried out by sliding a rewind lever 151 leftward in the drawing. The rewind lever 151 carries a control pin 151a having an extreme end thereof in contact with an inclined surface 127b of the changeover fork 127. As the rewind lever 151 slides leftward, this control pin 151a lifts the changeover fork 127 against the urging force of the spring 127a. Although, as described hereinbefore, this state permits the transmission changeover gear 116 and sprocket gear 124 to move upward, the gear 115 operatively connected to the motor M is in engagement with the changeover gear 116 at this time and, since a frictional force between the two gears 115 and 116 is greater than the urging force of the spring 225, the changeover gear 116 and the sprocket gear 124 remain in a lower position.

The rewind lever further carries a control pin 151b having an extreme end thereof in contact with an inclined portion 110c of the wind stop lever 110. As the rewind lever slides leftward, the control pin 151b causes the wind stop lever 110 to pivot counterclockwise about the axis P8, whereby the projection 110b disengages from the wind stop cam 111 rendering the sprocket 117 and the spool 118 rotatable.

When the rewind lever 151 slides to a leftward end, a cutout 151c defined in the lever 151 is engaged by a projection 153a of a rewind stop lever 153, whereby the rewind lever 151 is retained in position at the leftward end. The rewind stop lever 153 is pivotable on an axis P11 and is urged by a spring 154 in the clockwise direction, namely toward a position to engage the rewind lever 151. The rewind stop lever 153 includes an arm 153b opposed to a microswitch S6. This switch S6 is closed by the arm 153b when the latter pivots clockwise with the rewind lever 151 retained at the leftward end. As described later, a control flow enters upon a film rewind routine when closure of the microswitch S6 is detected.

First the motor M rotates clockwise and the mirror 113 is lifted as described hereinbefore. When the microswitch S3 is closed, the motor M stops. At the same time, the reduction gear 102 and the wind stop release sector 103 rotate counterclockwise, and the planet gear 112 disengages from the large gear portion 113a of the reduction gear 113. This eliminates the friction between the gear 115 and the transmission changeover gear 116, whereupon the changeover gear 116 and the sprocket gear 124 are lifted by the urging force of the spring 225.

As a result, the clutch projection 124a of the sprocket gear 124 disengages from the clutch recess 117a of the sprocket 117, and the sprocket gear 124, shutter charge gear 125, wind stop gear 129 and spool gear 126 are freed from the direct drive by the motor M. The pin 119 provided on the sprocket shaft 120 also disengages from the first groove 116a defined in the transmission changeover gear 116, freeing the sprocket shaft 120 and the sprocket 117 from the direct drive by the motor M.

After stopping once, the motor M begins rotating counterclockwise bringing the planet gear 112 back into engagement with the large gear portion 113a of the reduction gear 113. As a result, the transmission changeover gear 116 begins rotating counterclockwise. The changeover gear 116 is coaxial with a rewind gear 155 and defines a second groove 116b on top. With the rotation of the changeover gear 116 the groove 116b assumes a position opposed to projections 155a defined on a bottom of the rewind gear 155, and then the changeover gear 116 moves further upward placing the projections 155a and the second groove 116b in engagement with each other. The rewind gear 155 then rotates counterclockwise. This rewind gear 155 is operatively connected through transmission gearing 156 to a rewind fork gear 158 rotatable in unison with a rewind fork 157. The two gears 155 and 158 and the transmission gearing 156 constitute film rewind means. As the rewind gear 155 rotates counterclockwise, the rewind fork 157 rotates clockwise whereby the film is rewound into the cartridge.

Thus, for the film rewinding the motor M is once rotated in the direction opposite to the direction in which the motor rotates for the film rewinding. This breaks the operative connection between the motor M and the gear 115 in engagement with the changeover gear 116, which enables a smooth conversion from the film winding power transmission system into the film rewinding power transmission system without the friction between the changeover gear 116 and the other gear. Therefore, the film winding and rewinding are carried out by the rotation in the same direction of the motor M, and the switching of the power transmission between the two functions is effected with ease.

As the film is rewound, the sprocket 117 and the spool 118 rotate clockwise, respectively. The rotation of the spool 118 causes rotation of the spool gear 126, wind stop gear 129, sprocket gear 124 and shutter charge gear 125. The wind stop gear 129 rotates counterclockwise, and a microswitch S5 is closed once per rotation of the wind stop gear 129 by contact with a switch cam 111b rotatable in unison with the wind stop gear 129. The shutter charge gear 125 also rotates counterclockwise. The roller 159 of the shutter charge lever 128 contacted by the shutter charge cam 125a rotatable in unison with the gear 125 is urged toward the pivotal axis P9 of this lever 128 as described hereinbefore. The counterclockwise rotation of the cam 125a causes the roller 159 only to slide along the slot 128b against this urging force, and the shutter charge lever, the aperture diaphragm return lever 107 and the interlocking lever 130 remain stationary.

An action taking place after the film rewinding will be described next.

The spool 118 is formed of electroconductive rubber, and a switch SF, not shown, is provided which is closed only when there is no film between the spool 118 and a press roller, not shown. This switch SF is closed when a leading end of the film comes off the spool 118 by the film rewinding action described above. As described later, the motor M is stopped by the control system after waiting for a time needed for completely recovering the film in the cartridge after the switch SF is closed.

A projection 160a formed on a back lid 160 is in contact with a bend portion 161a of a back lid interlocking lever 161. This lever 161 is pivotable on an axis P12, has an arm 161b opposed to a bend portion 153b of the rewind stop lever 153, and is urged in the counterclockwise direction by a spring 162. When the back lid 160 is closed, the lever 161 is retained, through the contact between the projection 160a of the back lid 160 and the bend portion 161a and against the urging force of the spring 162, in a position such that the arm 161b is clear of the bend portion 153b of the rewind stop lever 153 whether the rewind stop lever 153 engages the rewind lever 151 or not. When the back lid 160 is opened after the rewinding is completed and the motor M is stopped, there occurs no contact by the projection 160a and the back lid interlocking lever 161 is caused by the urging force of the spring 162 to pivot counterclockwise.

The arm 161b of the interlocking lever 161 also pivots counterclockwise and abuts against the bend portion 153b of the rewind stop lever 153 to cause the latter to pivot counterclockwise. As a result, the projection 153a of the lever 153 releases the rewind lever 151 whereupon the rewind lever 151 moves rightward in the drawing under the urging force of the spring not shown. With this movement, the transmission changeover gear 116 is depressed by the changeover fork 127 which is no longer contacted by the control pin 151a, to disengage from the rewind gear 155 and engage with the sprocket shaft 120. The sprocket gear 124 also is depressed to couple with the sprocket 124. Therefore, the power transmission system is in the state for winding the film. Further, the wind stop lever 110 which is no longer contacted by the control pin 151b rotates clockwise, and its projection 110b contacts a peripheral wall of the wind stop cam 111 if the film winding and the shutter charging are not completed at the end of the film. In this state the microswitch S4 remains closed.

On the other hand, the counterclockwise pivoting of the rewind stop lever 153 opens the microswitch S6 whereupon the motor M begins rotating counterclockwise. The sprocket 117 and spool 118 rotate counterclockwise by the same action as in the film winding step described hereinbefore, charging the shutter and causing the stop lever 106 to engage the aperture diaphragm return lever 107. The microswitch S4 is opened and the motor M is stopped when the projection 110b of the wind stop lever 110 engages the cutout 111a of the wind stop cam 111 with the rotation of the wind stop gear 129. In other words, when the back lid 160 is opened after the film is rewound, the film winding action always takes place until completion of the film winding regardless of conditions at the time of film finish.

The control system for controlling the described motor-driven film winding and rewinding system will be described next.

Figure 3:
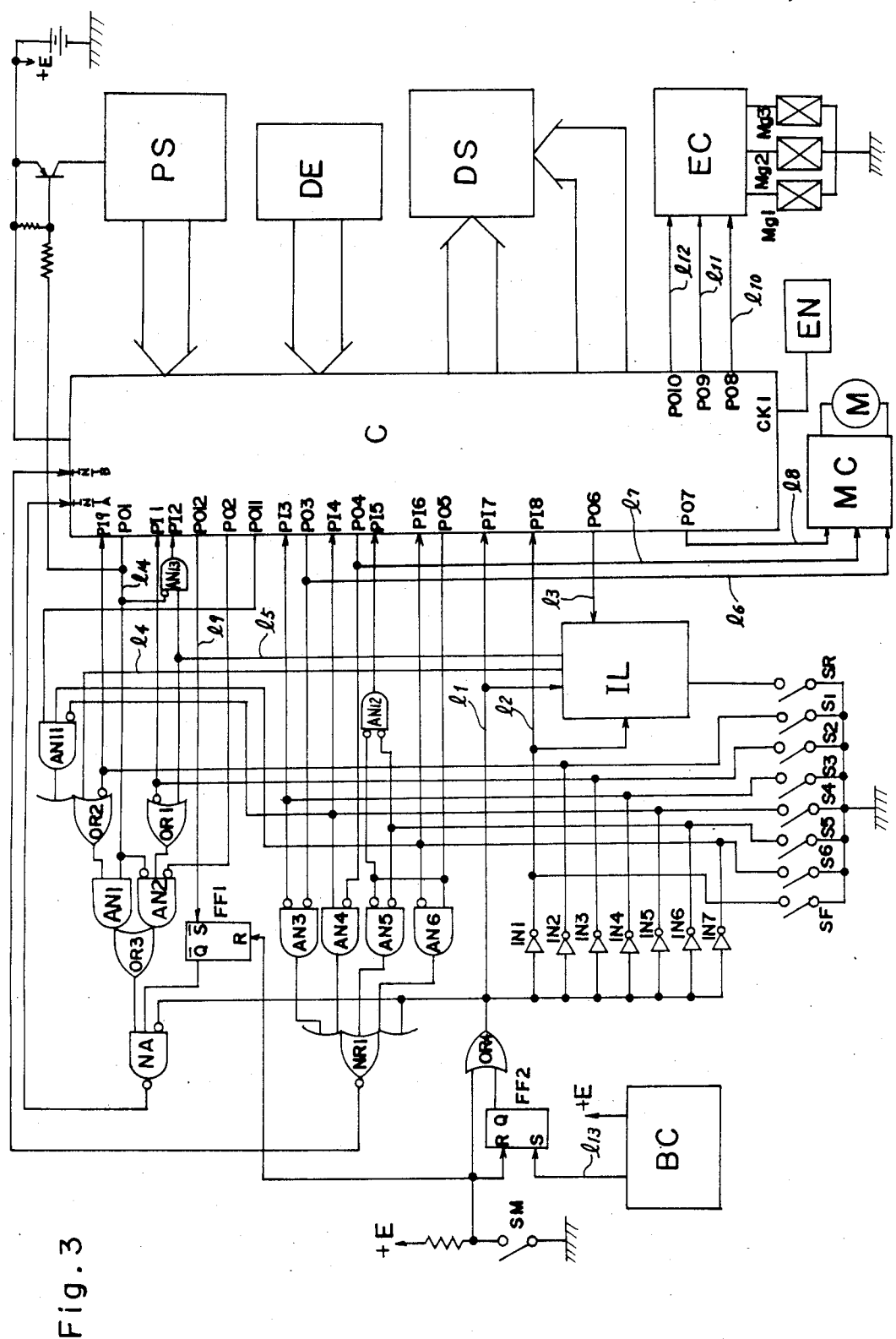
FIG. 3 is a circuit diagram of a control system.

FIG. 3 shows a circuitry of the control system. This control system comprises a microcomputer C as its principal component. The microcomputer C includes input ports PI1–PI9 the output ports PO1–PO12. Each of the output ports PO1–PO12 normally is in "H" level and changes to "L" level when in operation. INTA and INTB denote interrupt input terminals, an interrupt takes place when each of the terminals INTA and INTB falls from "H" level to "L" level.

S1 denotes a meter switch, and S2 denotes a shutter release switch which is closed when a shutter button is depressed. S3 is the mirror lift completion switch which is closed when the mirror is lifted. S4 is the wind completion switch which is closed at the beginning of film winding and opened upon completion thereof. S5 is the timing switch which is closed each time a frame in the film is advanced during the film winding and rewinding. Signals from this switch S5 is output from an AND gate AN5 only during the film rewinding. S6 is the rewind switch which is closed by the rewinding action. SR is a back lid switch which is operable with opening and closing of the back lid and is closed only when the back lid is opened. SF is the film detector switch which is opened when the film is wound around the spool. SM is a main switch. The switches S3–S6 comprise microswitches operable by the levers with which they are associated, respectively, as described hereinbefore, and are arranged as shown in FIG. 1.

Input signals for the interrupt input terminal INTA are switched and forbidden by OR gates OR1, OR2 and OR3, AND gates AN1, AN2 and AN11, and NAND gate NA. One of output signals from the OR gate OR1 or OR gate OR2 is selected by the AND gates AN1 and AN2 and OR gate OR3 in accordance with an output signal 114 of the output port PO1 of the microcomputer C. Input signals for the interrupt input terminal INTB are switched and forbidden by AND gates AN3–AN6 and NOR gate NR1. Its selection is carried out in accordance with output signals of output ports PO3–PO5 of the microcomputer C.

BC denotes a battery circuit which outputs an "H" level pulse signal 113 and sets a flip-flop FF2 when a source voltage is below a predetermined voltage. This flip-flop FF2 is reset by opening the main switch SM. When the flip-flop FF2 is set or the main switch SM is opened, the interrupt input terminal INTB changes to "L" level and an interrupt takes place through the OR gate OR4 and NOR gate NR1. On the other hand, the interrupt input terminal INTA changes to "H" level through the NAND gate NA, and an interrupt input to this terminal INTA is prevented. A flip-flop FF1 is set by a signal 19 of an output port PO12 of the microcomputer C, and the interrupt input terminal INTA changes to "H" level through the NAND gate NA to prevent an interrupt input to this terminal INTA likewise. This flip-flop FF1 is reset by opening the main switch SM.

Figure 7:
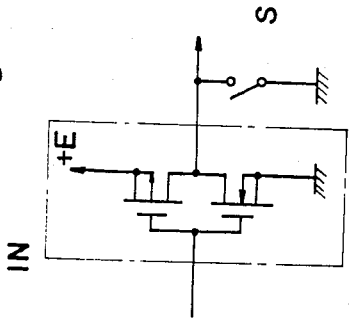
FIG. 7 is a circuit diagram of an inverter.

Each of inverters IN1–IN7 comprises a C-MOS type inverter as shown in FIG. 7, and the ON resistance of P-channel MOSFET is set to about 100 kΩ. Each of the inverter IN1–IN7 acts as pullup resistance when its input is in "L" level and as pulldown resistance when its input is in "H" level. Therefore, power consumption when the switches S1–S6 and SF are closed is minimized.

Figure 4:
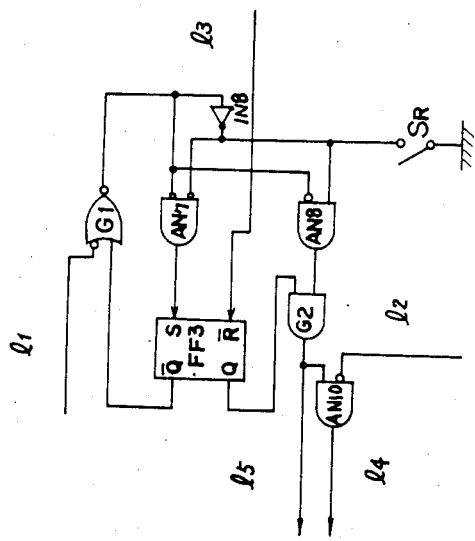
FIG. 4 is a circuit diagram of a memory unit.

IL denotes a memory unit which memorizes the closure of the back lid switch SR, outputs an operation signal 15 when the switch SR is opened and the main switch SM remains closed, and outputs an operation signal 14 when in this state the film detector switch SF is closed. FIG. 4 shows a circuit of the memory unit IL.

An inverter IN8, like the other inverters IN1–IN7, comprises a C-MOS type inverter as shown in FIG. 7. A flip-flop FF3 normally is reset by a pulse signal 13 output from the output port PO6 of the microcomputer C. An output terminal $\overline{Q}$ of this flip-flop FF3 is connected through a NOR gate G1 to the AND gate AN7 and inverter IN8. The other input terminal of the NOR gate G1 receives an output signal 11 of the OR gate OR4 associated with the main switch SM. The output signal 11 is in "L" level when the main switch SM is closed. At this time or when the flip-flop FF3 is reset, the input signal for the inverter IN8 is in "L" level and the inverter IN8 acts as pullup resistance for the back lid switch SR.

Further, at this time the AND gate AN7 permits a signal indicative of the state of the back lid switch SR to be input to the flip-flop FF3. The AND gates AN8 and G2 receive an "H" level signal from the output terminal Q of the flip-flop FF3 and the output an "H" level operation signal 15 only when the back lid switch SR is opened and the main switch SM is closed. In this state and only when the film detector switch SF is closed, namely when an input signal 12 is in "L" level, an AND gate AN10 outputs the operation signal 14.

Figure 5B:
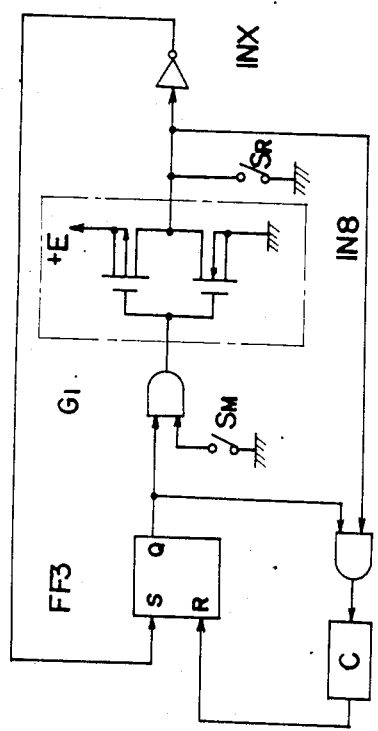
FIGS. 5A and 5B are circuit diagrams showing the principle of the memory unit, respectively.
Figure 5A:
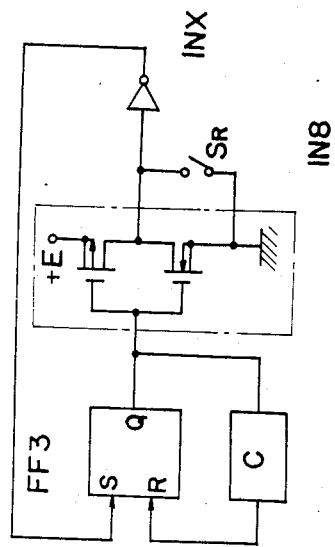

The principle of the described memory unit IL may be represented by a circuit diagram as shown in FIG. 5A, or may be represented by a circuit diagram as shown in FIG. 5B, the latter being added with a set switch, for example.

The former memory unit IL will be described first with reference to FIG. 5A.

The memory unit IL comprises the flip-flop FF3 acting as memory means and having the output terminal Q connected to an input of the C-MOS type inverter IN8 acting as switching means. The back lid switch SR acting as starter switch is connected to an output of the inverter IN8 in parallel with the MOSFET of the N-channel. An output of the C-MOS type inverter IN8 is input to a set input terminal S of the flip-flop FF3. The output terminal Q of the flip-flop FF3 is at the same time connected to the microcomputer C acting as operator means. The microcomputer C carries out a predetermined operation when the flip-flop FF3 is set and the terminal Q changes to "H" level. An output of the microcomputer C is input to a reset input terminal R of the flip-flop FF3. The flip-flop FF3 is reset upon receipt of an output signal of the microcomputer C at the end of the operation. An inverter INX is provided for conformity of the logic.

In an initial state, the flip-flop FF3 is reset by the output signal of the microcomputer C at the end of the operation, and the back lid switch SR is opened. This state is stable with the output terminal Q of the flip-flop FF3 in "L" level, the output of the inverter IN8 inverted to be in "H" level, and the input terminal S of the flip-flop FF3 further inverted to be in "L" level. At this time, the inverter IN8 is acting as pullup resistance with the MOSFET of P-channel in "ON" state, but no electric current occurs since the back lid switch SR is opened.

When the back lid switch SR is closed, an electric current flows through the switch SR. Simultaneously, the output of the C-MOS type inverter IN8 is grounded and changes to "L" level. The inverter INX inverts the signal therefrom the transmits an "H" level signal to the input terminal S of the flip-flop FF3. This sets the flip-flop FF3 and the output terminal changes to "H" level. Thus, the microcomputer C begins the predetermined operation. On the other hand, since the input to the C-MOS type inverter IN8 changes to "H" level, this inverter IN8 acts as pulldown resistance and the MOSFET of P-channel turns "OFF". Accordingly, no current flows through the back lid switch SR. The output of this inverter IN8 changes to "L" level which is maintained until the flip-flop FF3 is reset, whether the starter switch SR is opened or closed. In other words, the above action constitutes a positive feedback action of the C-MOS type inverter IN8 which is one example of switching means, with respect to the closing action of the back lid switch SR acting as starter switch.

Figure 6:
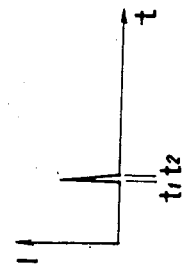
FIG. 6 is a graph showing an electric current in the memory unit.

The electric current I flowing through the back lid switch SR during the above operation is as illustrated in FIG. 6, for example. The current flows for a split second when the back lid switch SR is closed, $t=t_1$, but the current thereafter stops when the MOSFET of P-channel of the C-MOS type inverter IN8 turns "OFF", $t=t_2$, as described above.

Referring next to FIG. 5B, the memory unit IL' represented by this circuit diagram will be described.

The memory unit IL' comprises the flip-flop FF3 acting as memory means and having the output terminal Q connected, together with the main switch SM, to the AND gate G1. An output of the AND gate G1 is connected to an input of the C-MOS type inverter IN8 acting as switching means. A set switch SR is connected to an output of the inverter IN8 in parallel with the MOSFET of the N-channel. An output of the C-MOS type inverter IN8 is input to a set input terminal S of the flip-flop FF3. An output signal of the flip-flop FF3 is at the same time input, together with a signal indicative of the state of the back lid switch SR, to the AND gate G2. An output of this gate G2 which is one example of output means is input to the microcomputer C acting as operator means. The microcomputer C carries out a predetermined operation when the output of this gate G2 changes to "H" level. An output of the microcomputer C is input to a reset input terminal R of the flip-flop FF3. The flip-flop FF3 is reset upon receipt of an output signal of the microcomputer C at the end of the operation. An inverter INX is provided for conformity of the logic.

In an initial state, the flip-flop FF3 is reset by the output signal of the microcomputer C at the end of the operation, and the main switch SM and back lid switch SR are opened. This state is stable with the output terminal Q of the flip-flop FF3 in "L" level, the output of the AND gate G1 in "L" level, the output of the inverter IN8 inverted to be in "H" level, and the input terminal S of the flip-flop FF3 further inverted to be in "L" level. At this time, the inverter IN8 is acting as pullup resistance with the MOSFET of P-channel in "ON" state, but no electric current flows since the back lid switch SR is opened.

When the back lid switch SR is closed, an electric current flows through the switch SR. Simultaneously, the output of the C-MOS type inverter IN8 is grounded and changes to "L" level. The inverter IN8 inverts the signal therefrom and transmits an "H" level signal to the input terminal S of the flip-flop FF3. This sets the flip-flop FF3 and the output terminal changes to "H" level. Thus, an operation permission signal is output to place the microcomputer C ready for operation. At this time the signal indicating the state of the back lid switch SR is in "L" level and the output of AND gate G2 is also in "L" level, wherefore the microcomputer C is not started.

On the other hand, since the output of the AND gate G1 changes to "H" level and the input to the C-MOS type inverter IN8 changes to "H" level, this inverter IN8 acts as pulldown resistance and the MOSFET of P-channel turns "OFF". Accordingly, no current flows through the back lid switch SR. The output of this inverter IN8 changes to "L" level which is maintained until the flip-flop FF3 is reset, whether the switch SR is opened or closed. In other words, the above action constitutes a positive feedback action of the C-MOS type inverter IN8 which is one example of switching means, with respect to the closing action of the back lid switch SR. Even if the back lid switch SR is opened then, the microcomputer C cannot be started since the output of the inverter IN8 is maintained in "L" level.

When the main switch SM is opened, the output of AND gate G1 changes to "L" level. The output of the inverter IN8 is inverted to be in "H" level and, if the back lid switch SR is opened, the input to the AND gate G2 changes to "H" level. On the other hand, the output of the inverter INX is further inverted to be in "L" level to be input to the flip-flop FF3, but the output terminal Q of the flip-flop FF3 is maintained to be in "H" level to continue outputting the operation permission signal. Thus, the output of the AND gate G2 which is acting as output means for the microcomputer C changes to "H" level, whereby the operation is carried out. In other words, the action for changing the input to inverter IN8 maintained in "H" level by the positive feedback, into "L" level by closing the main switch SM constitutes a cancellation action with respect to the positive feedback, and the AND gate G1 acts as the cancellation means.

The electric current I flowing through the back lid switch SR during the above operation is as illustrated in FIG. 6, for example. The current flows for a split second when the back lid switch SR is closed, $t=t_1$, but the current thereafter stops when the MOSFET of P-channel of the C-MOS type inverter IN8 turns "OFF", $t=t_2$, as described above.

Figure 8:
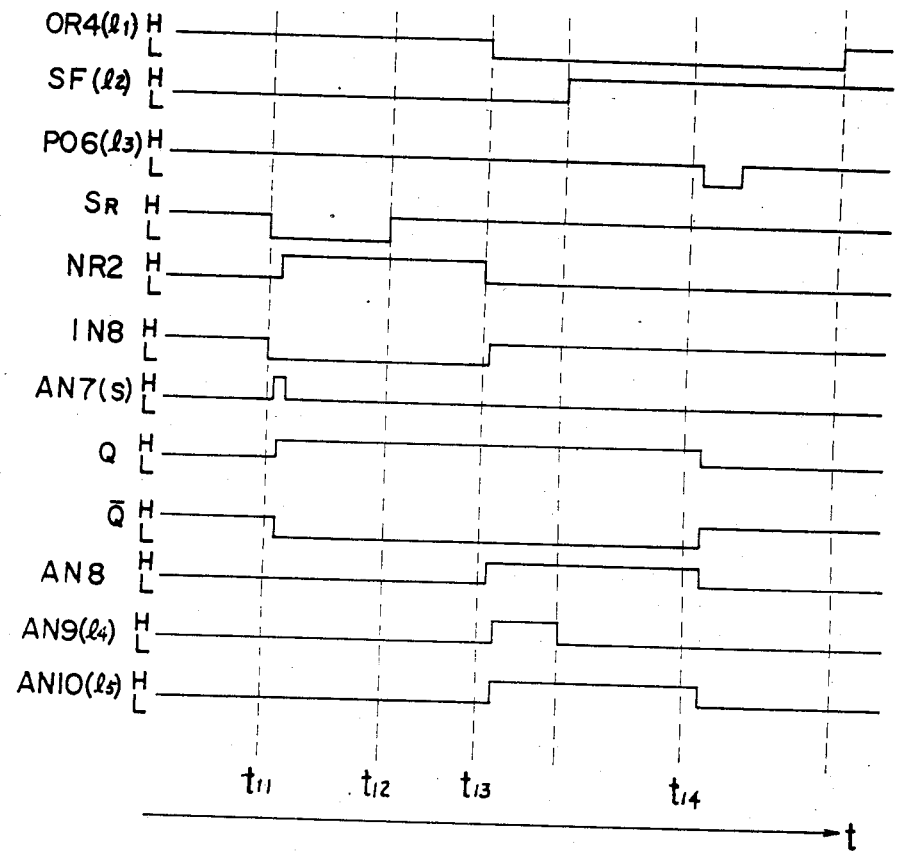
FIG. 8 is a time chart showing an operation of the memory unit.

The operation of this memory unit IL will be described next with reference to the time chart shown in FIG. 8.

In the initial state the main switch SM is opened, and the output signal l1 of the OR gate OR4, the output of the inverter IN8, and the output terminal Q of the flip-flop FF3 are in "H" level. At this time a film is not loaded. The back lid is closed and the back lid switch SR is opened.

First, when the back lid is opened for loading the film, $t=t_{11}$, the back lid switch SR is closed and the output of the AND gate AN7 changes to "H" level to set flip-flop FF3. This changes the input to the inverter IN8 to "H" level and the inverter IN8 acts as pulldown resistance as described hereinbefore. Therefore, although the back lid switch SR is closed, the electric current flowing through this switch SR is minimal thereby preventing wasteful power consumption.

When the back lid is closed, $t=t_{12}$, the back lid switch SR is opened by the output terminals Q and the output of the inverter IN8 are maintained in the level of the setting time. When the main switch SM is opened, $t=t_{13}$, the output signal l1 of the OR gate OR4 changes to "L" level, the output of the NOR gate G1 changes to "L" and the output of the inverter IN8 changes to "H" level. Therefore, the output of the AND gate G2 changes to "H" level and the output signal l5 of the AND gate AN9 changes to "H" level.

Since at this time the film is not taken up by the spool yet and the film detector switch SF remains closed, the output signal l4 of the AND gate AN10 too changes to "H" level. The two signals l4 and l5 are input to the interrupt input terminal INTA to carry out an initial film loading operation in accordance with a sequence control by the microcomputer C as described later. When the initial loading operation is completed by taking up the film by three frames, $t=t_{14}$, the "L" level pulse signal l3 is output from the output port PO6 of the microcomputer C, and the flip-flop FF3 is reset by this signal l3 to be in a standby state.

Thus, the signal for initiating the initial loading operation derived from the opening of the back lid switch SR caused by the closing of the back lid is memorized by the flip-flop FF3 until the main switch SM is closed even if the main switch is opened. This minimizes the electric current flowing through the closed back lid switch SR until the main switch SM is closed, thereby to eliminate wasteful power consumption.

When the main switch SM is closed, the initial loading operation takes place simultaneously with the closing of the back lid. That is to say the output signal l1 is in "L" level and the input to the inverter IN8 too changes to "L" level. When in this state the back lid is open, the back lid switch SR is closed and one of the inputs to the AND gate AN8 is in "L" level. Therefore the output of the AND gate AN8 too is in "L" level. On the other hand, the output of the AND gate AN7 is also in "L" level and the flip-flop FF3 is set. When in this state the back lid is closed, the back lid switch SR is opened and the output of the inverter IN8 is in "H" level. Therefore the output of the AND gate AN8 changes to "H" level. Since the output terminal Q of the flip-flop FF3 is also set and is in "H" level, the output signal l5 from the AND gate G2 is in "H" level.

The control system will be described further with reference to FIG. 3 again.

Figure 9:
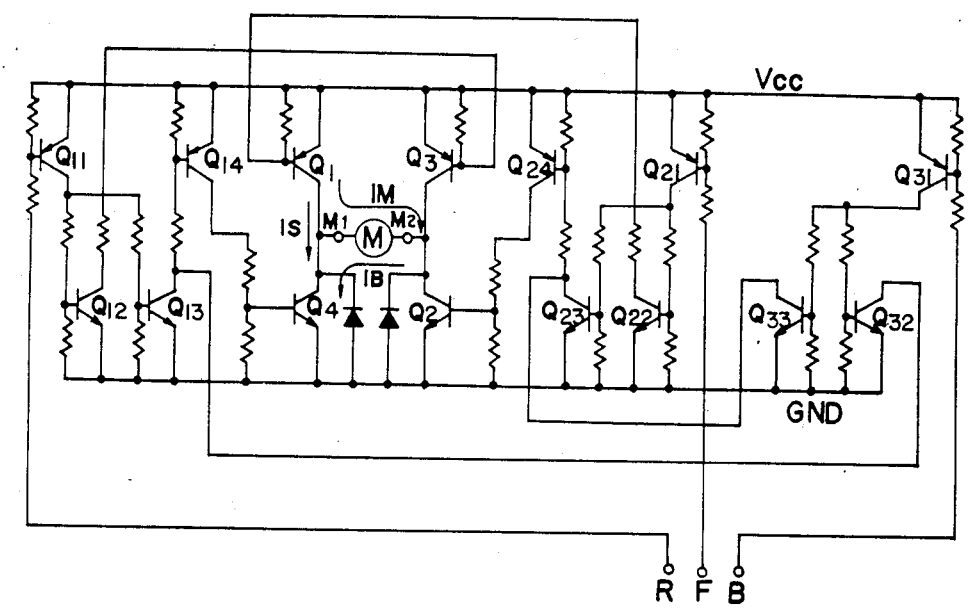
FIG. 9 is a diagram of a motor control circuit.

MC denotes a motor drive circuit which rotates the motor M forward and backward and brakes the motor M in accordance with control signals 16–18 received from the microcomputer C, respectively. As described hereinbefore, the motor M, through switching of the gears, effects the release starting to the completion of mirror lifting by rotating backward, and the mirror lowering to the film winding and rewinding by rotating forward. FIG. 9 shows details of the motor control circuit.

Terminal R is an input terminal for receiving the control signal 16 to drive the motor M backward. Terminal F is an input terminal for receiving the control signal 17 to drive the motor M forward. Terminal B is an input terminal for receiving the control signal 18 and acts to electrically brake the motor M by causing a short circuit between two terminals of the motor M. The terminals R, F and B carry out the above functions when the control signals 16–18 are in "L" level, respectively.

When the input terminal F is in "L" level, a transistor Q21 operates, then transistors Q22–Q24 operate and ultimately transistors Q1 and Q2 operate. Then, one of the terminals M1 of the motor M changes to the source voltage Vcc and the other terminal M2 is grounded whereby the motor M is driven to rotate forward. Similarly, when the input terminal R is in "L" level, a transistor Q11 operates, then transistors Q11–Q13 operate and ultimately transistors Q3 and Q4 operate. Then, one of the terminals M1 is grounded and the other terminal M2 changes to the source voltage Vcc whereby the motor M is driven to rotate backward. On the other hand, when the input terminal B is in "L" level, a transistor Q31 operates, then transistors Q32, Q33, Q24 and Q14 operate and ultimately the transistors Q2 and Q4 operate. Then, the short circuit occurs between the two terminals M1 and M2 of the motor M and the motor M is electrically braked.

The control signals 16-18 input to the input terminals R, F and B of the motor drive circuit MC are arranged such that two or more of these signals do not change to "L" level at the same time. If these input terminals R, F and B were fed with two or more "L" level signals, the transistors Q1 and Q4 or the transistors Q2 and Q3 would operate at the same time causing a short circuit between the source voltage Vcc and the grounding GND and hence a great current flow. Therefore, the input control signals 16-18 change to "L" level with a time lapse therebetween.

Figure 10:
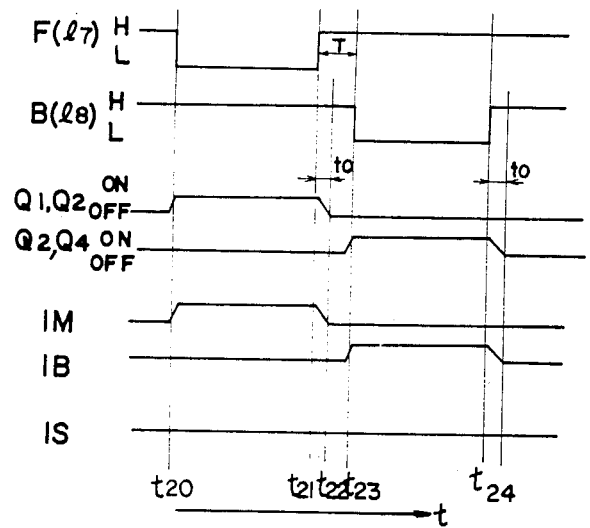
FIG. 10 is a time chart showing an operation of the motor control circuit.

This feature is described taking for example the input terminal F for forward rotation of the motor and the input terminal B for braking the motor with reference to the time chart of FIG. 10.

When the "L" level signal l7 is input to the input terminal F for causing the forward rotation of the motor, $t=t_{20}-t_{21}$ the transistors Q1 and Q2 operate and an electric current is generated in the direction IM in FIG. 9. However, a certain period of time $\tau_0$ is required for the transistors Q1 and Q2 to become completely inoperative. Therefore, the "L" level signal l3 is input to the motor braking input terminal B after lapse, $t=t_{23}$, of a time T which is longer than the time $\tau_0$ required for the transistors to stop operating after the "L" level signal input to the input terminal F stops, $t=t_{21}$.

Thus, there occurs no variation in the source voltage Vcc due to the short-circuiting current IS between the source voltage Vcc and the grounding GND caused by the transistor Q4 beginning to operate before the transistor Q1 stops operating completely as where the "L" level signal l8 is input to the motor braking input terminal B the moment, $t=t_{21}$, the "L" level signal input to the motor forward rotation input terminal F is stopped. Similarly control signals 16 and 18 input to the motor backward rotation input terminal R and motor braking input terminal B, and the control signals l7 and l6 input to the motor forward rotation input terminal F and motor backward rotation input terminal R are fed after lapse of a longer time than the time $\tau_0$ required for the transistors to stop operating, respectively.

The description of the control system will be continued referring back to FIG. 3.

PS denotes a metering unit which outputs the brightness information Bv concerning a detected photographing object as a digital value to the microcomputer C. DE is an information setting unit which sets and outputs to the microcomputer C an exposure control mode, film sensitivity information Sv, aperture information Av and shutter speed information Tv. DS is an indicating unit comprising a decoder, a driver and an indicating element for indicating data received from the microcomputer C. EC is an exposure control unit which receives control signals l10-l12 from the output ports PO8-PO10 of the microcomputer C to control an aperture control magnet Mg1, a shutter front blade control magnet Mg2 and a shutter rear blade control magnet Mg3, respectively.

EN is an encoder which outputs a train of pulses in accordance with aperture diaphragm movements. The pulses output by this encoder EN are input to a clock input terminal CKI of the microcomputer C, and the number of diaphragm movement steps preset in a preset counter in the microcomputer C is decremented by the number of input pulses. When the count becomes "0", the microcomputer C outputs a signal l10 for actuating the aperture control magnet Mg1, whereby the aperture is controlled to be at a target aperture value.

Figure 11A:
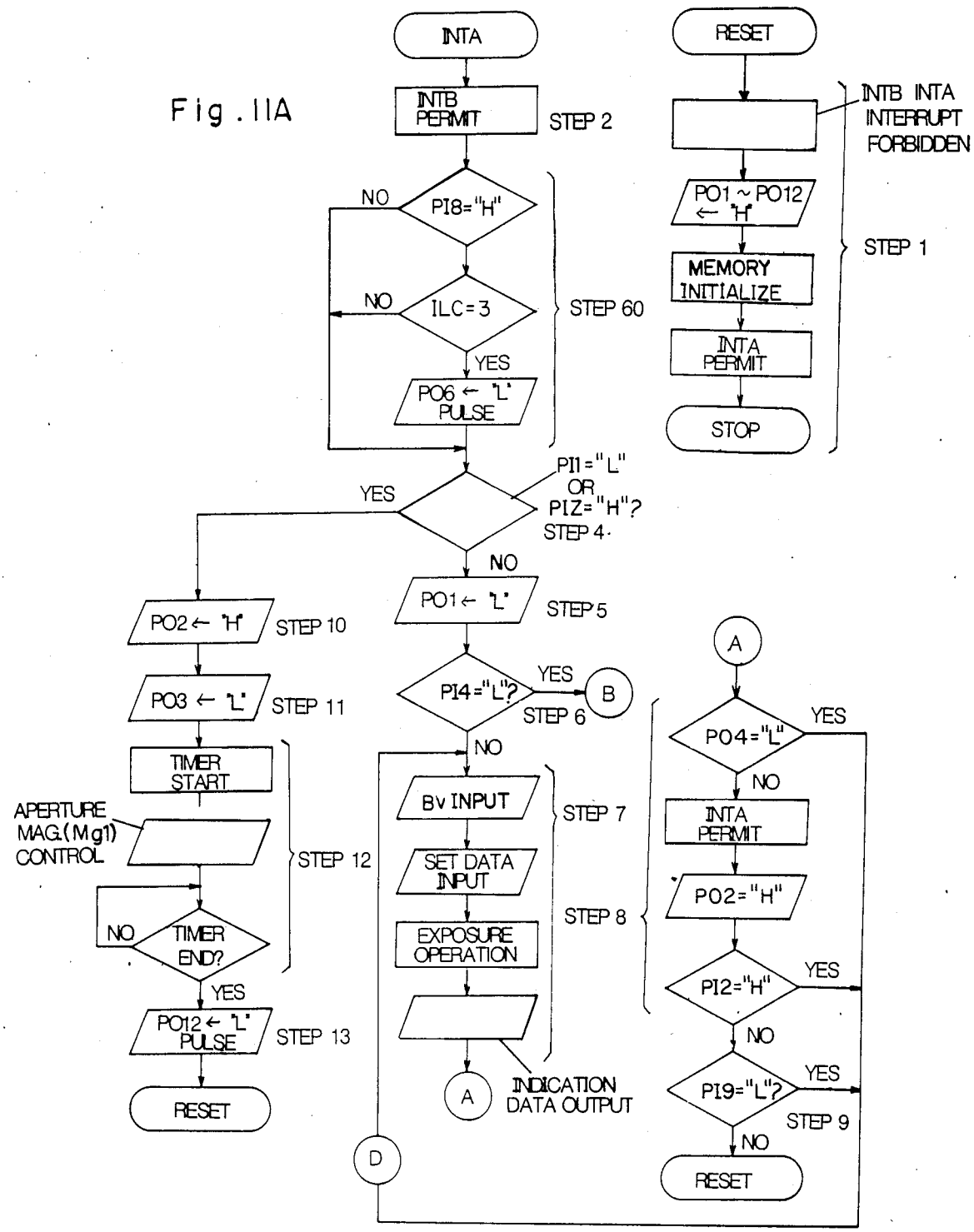
FIGS. 11A, 11B, 11C, 12, and 13 are flow charts showing operations of the control system.
Figure 11B:
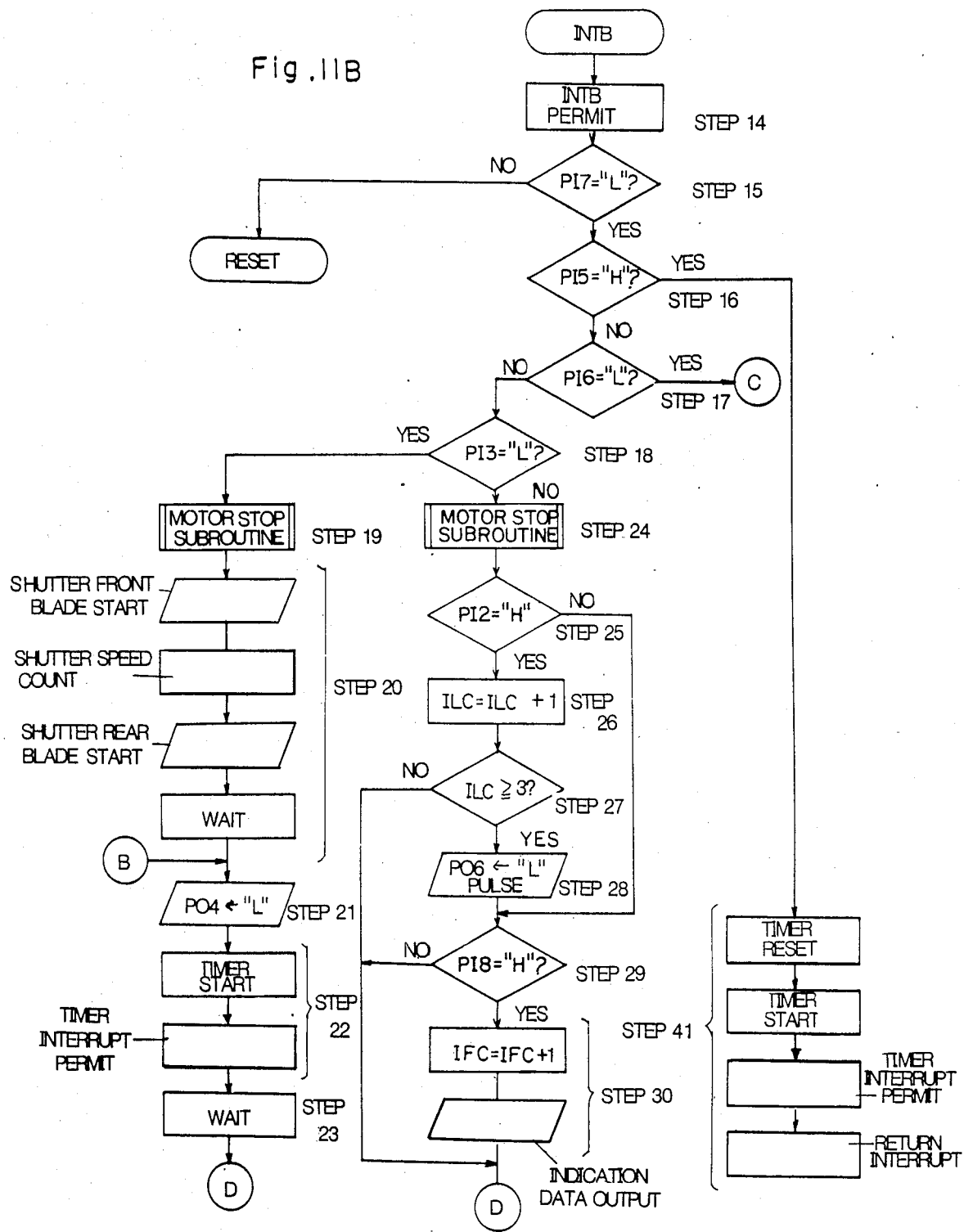
Figure 11C:
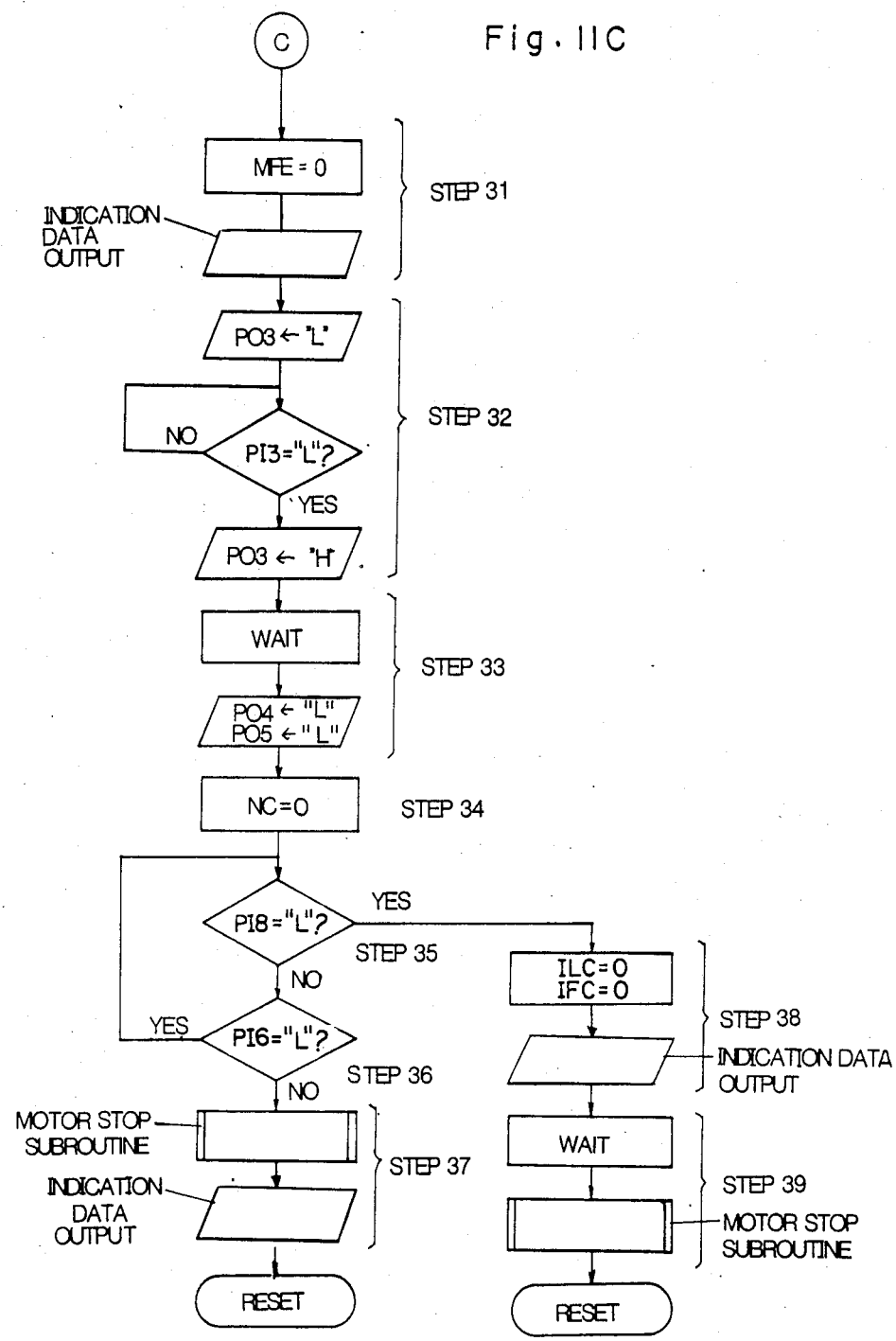
Figure 13:
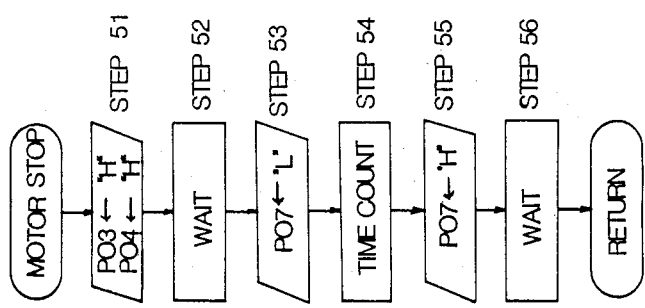
Figure 12:
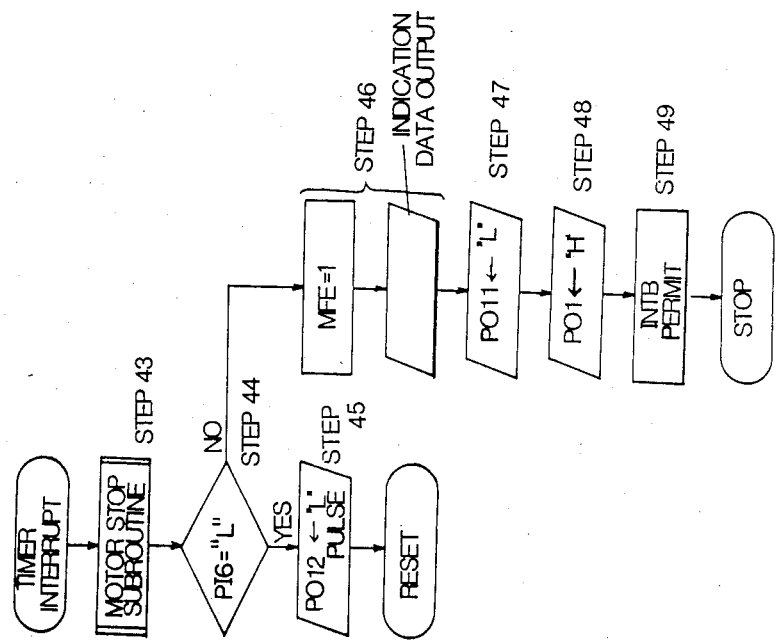

The operation of the camera having the described motor-driven film winding and rewinding system and the control system therefor will be described next with reference to FIGS. 11 through 13 and also to FIGS. 1, 3 and 4. Figures to be referred to are not mentioned in the course of description.

The microcomputer C normally is initialized with each of the output ports PO1–PO12 in "H" level, and each momory too is initialized standing in a state to permit an interrupt to take place at the interrupt input terminal INTA (Step 1).

An operation for ordinary picture taking will be described first.

When the meter switch S1 is closed with the main switch SM closed, an "H" level signal is output through the AND gate AN1 and OR gate OR3 since the output of OR gate OR2 changes to "H" level and the signal 14 from the output port PO1 is also in "H" level. On the other hand, since the flip-flop FF1 is reset, the output of the NAND gate NA changes to "L" level and an interrupt takes place at the interrupt input terminal INTA. This starts the microcomputer C.

First an interrupt at the interrupt input terminal INTB is permitted (Step 2), and then after Step 60 to be described later an interrupt judgment is carried out (Step 4). In other words, the state of the release switch S2 is judged by the state of the input port PI11 and whether initial loading or not is judged by the state of the input port PI12. If the release switch S2 is open and it is not initial loading, the microcomputer C judges the interrupt to be due to closing of the meter switch S1 and changes the output port PO1 to "L" (Step 5). Then the transistors TR operate and metering is started. At the same time the input to the AND gate AN1 changes to "L" level, the input to the AND gate AN2 changes to "H" level, and the source of input to the interrupt input terminal INTA is switched from the OR gate OR2 to OR gate OR1. Since at this time the output port PO2 is in "H" level, an interrupt to the interrupt input terminal INTA is forbidden.

Subsequently, when a judgment is made that the input port PI4 is in "H" level and winding is completed (Step 6), the metering information Bv, exposure control mode and various pieces of information SV, AV and TV are input for carrying out an exposure calculation and its result is output to the indicating unit DS for indication (Step 7). If thereafter the "L" level signal for film winding is not output, an operation according to an interrupt signal from the interrupt input terminal INTA is permitted and the output port PO2 is changed to "L" level to enable an interrupt from the OR gate OR1 (Step 8). Then the state of the meter switch S1 is judged by the state of the input port PI9 (Step 9). Thus, when the meter switch S1 is opened during the metering or the input port PI9 changes to "H" level, the metering is discontinued to return to the reset state. If the meter switch S1 remains closed, a metering operation routine (Steps 7–9) is repeated while waiting for an interrupt to occur by closing of the release switch S2.

When the release switch S2 is closed, the output of the OR gate OR1 changes to "H" level and the interrupt takes place at the interrupt input terminal INTA through the AND gate AN2, OR gate OR3 and NAND gate NA. When this switch S2 is judged to be closed by detecting the "L" level of the input port PI1 (Step 4), the program proceeds to a release processing routine.

In this routine, the output PO2 is changed to "H" level first to forbid a further interrupt (Step 10). Thereafter, the output port PO3 is changed to "L" level to input the "L" level signal 16 to the motor backward rotation input terminal R of the motor drive circuit MC (Step 11). The motor M then starts rotating backward, rotating the motor shaft 100 clockwise to lift the mirror 213. At this time the input to the NAND gate AN3 is in "L" level and permits an interrupt to take place at the interrupt input terminal INTB by closing of the mirror lift completion switch S3.

At this time an internal timer is started. This timer is set to a value longer than a time normally required for the mirror lift completion switch S3 to close after the motor M begins rotating. If a normal release operation is hampered by an overload or other trouble and the mirror lift completion switch S3 is not closed within the predetermined time, the "L" level pulse signal 19 is output from the output port PO12 to set the flip-flop FF1 (Steps 12 and 13) and the program returns to the reset routine.

When the normal release operation is carried out, the diaphragm moves to establish a desired aperture until the mirror lift is completed. When this is ascertained by counting the pulses from the encoder, the aperture control magnet Mg1 is controlled to determine an aperture size and the program waits for the interrupt to take place by the closing of the mirror lift completion switch S3 (Step 12).

When the mirror lift completion switch S3 is closed, the output of the AND gate AN3 changes to "H" level and the output of the NOR gate NR1 changes to "L" level whereby the interrupt takes place at the interrupt input terminal INTB.

In an interrupt processing routine, an interrupt judgment is effected (Steps 15–18) and, if the interrupt is judged to have occurred due to the closing of the mirror lift completion switch S3 by detecting the input port PI3 being in "L" level (Step 18), the motor M is stopped immediately (Step 19). At this time the output port PO3 is in "H" level (FIG. 11, Step 5) forbidding the interrupt due to the closing of this switch S3. Then a shutter speed control is effected (Step 20) and thereafter the output port PO4 is changed to "L" level to input the "L" level signal 17 to the motor forward rotation input terminal F of the motor drive circuit MC (Step 21). The motor M then starts rotating forward, rotating the motor shaft 100 counterclockwise to lower the mirror 213 and wind the film. By changing the output port PO4 to "L" level at this time, the input to the AND gate AN4 is changed to "L" level permitting an interrupt due to the opening of the wind completion switch S4 to take place at the interrupt input terminal INTB.

On the other hand, the internal timer is started simultaneously with the start of the motor M to enable a timer interrupt (Step 22). The timer set value is longer than a time required for the film to be advanced by one frame. After waiting for a predetermined time until the mirror 213 stabilizes to enable the metering (Step 23), the program returns to the metering operation routine. Since the output port PO4 is in "L" level during this operation routine, the interrupt to the interrupt input terminal INTA is forbidden (Step 8).

In other words, even if the release switch S2 is closed, it does not bring about any operation and the judgment of the meter switch S1 is not effected either. Therefore, the metering operation loop is repeated until the winding is completed. It is to be noted that, since the output port PO5 remains in "H" level during the winding, closing or opening of the switch S5 does not change the outputs of the AND gates AN5 and AN12 to "H" level and therefore does not affect the operation of the microcomputer C.

If the interrupt due to the opening of the wind completion switch S4 does not take place within a predetermined period, the timer interrupt takes place and the program moves on to a processing carried out at film ending as described later. When the film is correctly wound by one frame, the wind completion switch S4 is opened, the output of AND gate AN4 is changed to "L" level, and the interrupt takes place at the interrupt input terminal INTB through the NOR gate NR1. In the interrupt processing routine the interrupt judgment is carried out (Steps 15–18). When the interrupt is judged to be due to the opening of the wind completion switch S4 by detecting the input port PI5 of input ports PI3–PI7 related to this interrupt being in "L" level and the others being in "H" level (Step 18), the motor M is stopped immediately (Step 24).

By this motor stopping subroutine (FIG. 11, Step 51) the output port PO4 changes to "H" level and forbids the interrupt resulting from the opening of the wind completion switch S4. Subsequently, when the input port PI2 is judged to be in "L" level and hence not the initial loading (Step 25) and presence of the film is determined by detecting the input port PI8 being in "H" level (Step 29), "1" is added to a film counter IFC and this data is output to the indicating unit DS for indication (Step 30). If a film is not loaded the film counter IFC is retained at "0". Thereafter the program returns to the metering operation routine (Steps 7–9) and waits for a next release operation.

An initial loading operation will be described next.

When the back lid 160 is opened once and then closed after loading a film to open the back lid switch SR, one of the output signals 14 from the memory circuit IL becomes "H" level if the main switch SM is closed and the film detector switch SF is closed. An "L" level signal is output through the OR gate OR2, AND gate AN1, OR gate OR3 and NAND gate NA, and an interrupt takes place at the interrupt input terminal INTA to start the microcomputer C.

Since at Step 4 the output of the AND gate AN13 becomes "L" level even if the output port PO1 is in "H" level and the operation signal 15 is in "H" level, the ordinary routine (Steps 2–9) is executed. When the output port PO1 changes to "L" level at Step 5 and the source of output to the interrupt input terminal INTA is switched to the OR gate OR1 to enable an interrupt from the interrupt input terminal INTA (Step 8), the "L" level signal is output through the OR gate OR1, AND gate AN2, OR gate OR3 and NAND gate NA to cause an interrupt at the interrupt input terminal INTA. When the output of AND gate AN13 is in "H" level and the input port PI2 is detected to be in "H" level, the release routine (Steps 10–13) is executed. Thereafter, as at the time of ordinary operation, the closing of the mirror lift completion switch S3 causes the interrupt at the interrupt input terminal INTB and a picture taking and film winding routine (Steps 19–23) is executed. When the film winding is completed and the wind completion switch S4 is opened, the motor M is stopped (Step 24).

Subsequently, if the input port PI2 is judged to be in "H" level and hence the initial loading (Step 25), "1" is added to a three-frame initial load counter ILC. If this counter ILC is at a number less than "3" (Step 27), the program returns to the metering operation routine (Steps 7–9) and an interrupt occurs at the interrupt input terminal INTA again to repeat the above initial loading action. The judgment of the state of the meter switch S1 at Step 9 is not carried out while the input port PI2 is in "H" level, and therefore the initial loading is effected regardless of the state of the meter switch S1. If the counter ILC reaches "3" (Step 27), the output port PO6 outputs the "L" level pulse signal 13 and resets the flip-flop FF3 of the memory cirucit IL (Step 28) as described hereinbefore. Consequently, the signal 15 from the memory circuit IL changes to "L" level and the output of the OR gate OR1 also changes to "L" level, and therefore the interrupt by this signal 15 does not take place.

Next, the state of the film detector switch SF is judged by the state of the input port PI8 (Step 29). If the film detector switch SF is judged to be closed by detecting the input port PI8 being in "L" level, namely if the film is taken up by the spool 118, the program returns to the metering operation routine (Steps 7–9) without renewing the film counter IFC and leaving a film frame counter at "0" and, after judging that the meter switch S1 is closed (Step 9), effects the resetting and stops. If the input port PI8 is detected to be in "H" level, the film is judged to have been taken up by the spool 118 properly, "1" is added to the film counter IFC, this data is output to the indicating unit, and the film frame counter indicates "1". This completes the initial loading.

If the back lid is closed with the film loaded, the operation signal 15 changes to "H" level. Since in this case the operation signal 14 remains in "L" level, the closure of the back lid alone does not result in an interrupt signal fed to the interrupt input terminal INTA to start the operation. However, if in this state the meter switch S1 is closed, the initial loading action takes place after executing the metering operation loop once. In order to prevent this, the "L" level pulse signal 13 is output from the output port PO6 to reset the flip-flop FF3 at Step 60 if the film is loaded and the initial load counter ILC is at "3". This changes the operation signal 15 to "L" level whereby the initial loading action does not take place.

An operation taking place from the film ending to the completion of the film rewinding will be described next.

When in the film winding routine (Steps 21–22) the motor is decelerated or stopped as a result of an overload caused by the film ending or a mechanical trouble, an interrupt due to the opening of the wind completion switch S4 does not take place. Then the set time of the timer started with the start of the film winding (Step 22) is exceeded and a timer interrupt takes place. At this time the motor M is stopped immediately (Step 43) to prevent an overcurrent from flowing to the motor M. When the input port PI6 is detected to be in "H" level indicating that the film is being wound (Step 44), a film ending memory MFE is set to "1" to store the film ending and this data is output to the indicating unit DS which indicates that the film has been wound to a last frame. This prompts the user to take the rewinding step.

Subsequently, the output of the AND gate AN11 is changed to "L" level by changing the output port PO11 to "L" level in order to forbid an interrupt occurring at the interrupt input terminal INTA as a result of the closure of the wind completion switch S4 during the winding. After this, the output port PO1 is changed to "H" level (Step 48), a state is established ready for operation when an interrupt signal is input to the interrupt input terminal INTB by closure of the rewind switch S6 (Step 49) and then the microcomputer C stops the operation. Thereafter the program waits for the interrupt to be caused by the closure of the rewind switch S6. After these steps the microcomputer C will not start even if the meter switch S1 is closed since an interrupt signal to the interrupt input terminal INTA is not accepted internally of the microcomputer C. Thus, wasteful power consumption by the metering and other functions is restrained.

If the rewind lever 151 is operated in this state, the rewind switch S6 is closed and the wind switch S4 is opened without fail. Accordingly, the output of the AND gate AN6 changes to "H" level and the output of the NOR gate NR1 changes to "L" level whereby an interrupt occurs at the interrupt input terminal INTB. If the input port PI6 is detected to be in "L" level which indicates an interrupt caused by the closure of the rewind switch S6 (Step 17), the program proceeds to a film rewind routine (Steps 31–39).

In this routine, first the film ending memory MFE is reset and this data is output to the indicating unit DS for indicating that the film is being rewound. Next, the motor M is put to reverse rotation by changing the output port PO3 to "L" level and, when the input port PI3 is detected to be in "L" level indicating the completion of mirror lift, the output port PO3 is changed to "H" level to stop the motor M. As described hereinbefore, this step is taken to break the operative connection between the gear 115 and the motor M by rotating the motor M once in the direction opposite to the direction in which the motor M rotates for the film winding, to permit the transmission changeove gear 116 and sprocket gear 124 to move smoothly and free of the friction due to the gear engagement into operative connection with the rewind power transmission system.

After waiting until the transistors for driving the motor M become inoperative, the output ports PO4 and PO5 are changed to "L" level (Step 33). This starts the forward rotation of the motor M for rewinding the film. At the same time, the interrupt due to the closure of the rewind switch S6 is forbidden and interrupts due to closure of the timing switch S5 is permitted. Thereafter, a counter NC for counting the number of interrupts caused by the closure of the timing switch S5 is cleared (Step 44), and the program waits for the interrupts to occur by the closure of the timing switch S5 while checking the state of the back lid switch S6 and film detector switch SF by means of the state of the input ports PI6 and PI8 (Steps 35 and 36).

In proper film rewinding one interrupt by the closure of the timing switch S5 occurs for every frame of the film. When the interrupts are judged to be due to the closure of the timing switch S5 during the film rewinding by detecting the "H" level of the input port PI5 (Step 16), the timer is reset and started again, the timer interrupt is permitted (Step 41) and the program returns to the film rewind routine (Steps 35 and 36). This timer is set to a value longer than a cycle of opening and closing of the timing switch S5 during the proper film rewinding. Therefore the timer interrupt takes place unless the interrupts due to the closure of timing switch S5 take place within the predetermined time caused by an overload or the like acting on the motor M during the film rewinding.

At this time the motor M is stopped immediately (Step 43). If the input port PI6 is detected to be in "L" level indicating that the film is being rewound, the "L" level pulse signal 9 is output from the output port PO12 to set the flip-flop FF1 (Step 45), and then the program returns to the reset routine (Step 1) and stops. In this case, therefore, the microcomputer C cannot start unless the main switch SM is opened once and then closed.

When the input port PI8 is detected to be in "L" level, the film detector switch SF is judged to be closed and the film is judged to have come off the spool indicating completion of the film rewinding (Step 35). Then the initial load counter ILC and the film counter IFC are set to "0" and this data is output to the indicating unit DS for indicating that the film rewinding has completed (Step 38). Thereafter the program waits for a time necessary for rewinding the film into the cartridge and stops the motor M.

In certain situations, the film winding step and shutter charging are not finished when the film comes to the end. In such a case, the wind completion switch S4 remains closed but the rewind switch S6 is closed as described hereinbefore, and therefore the output of the AND gate AN11 is in "L" level and no interrupt occurs at the interrupt input terminal INTA during the film rewinding. When the rewinding is completed and the back lid 160 is opened to take out the cartridge, the rewind control unit is released, the rewind switch S6 is opened and the output of AND gate AN11 changes to "H" level. Thus, through the OR gate OR2, AND gate AN1 and OR gate OR3 the output of NAND gate NA changes to "L" level and the interrupt takes place at the interrupt input terminal INTA. This starts the microcomputer C, the film winding step and shutter charging are determined unfinished by detecting the input port PI4 being in "L" level (Step 6) and the program proceeds to the film wind routine (Steps 21–23).

In this routine, as at the film winding time, the motor M is rotated forward to carry out winding of a remaining film portion and shutter charging. When the switch S4 is closed upon completion of the winding, the winding action is stopped at Step 24 et seq. and the program proceeds to the metering operation routine. If in this routine the meter switch S1 is open, that is if the input port PI9 is detected to be in "H" level, the program returns to the reset routine (Step 1) and stops.

If the back lid is opened during the rewinding, opening the rewind switch S6, and the input port PI6 is detected to be in "H" level (Step 36), the rewinding is discontinued cancelling a rewind indication (Step 37) and the program proceeds to the reset routine.

An operation carried out when the main switch SM is opened and when the source voltage of a battery is below the predetermined voltage will be described next.

When the main switch SM is opened, the input signal for the OR gate OR4 changes to "H" level. When the battery source voltage falls below the predetermined voltage, an "H" level pulse signal 113 is output to set the flip-flop FF2, and the output signal of this flip-flop FF2 changes to "H" level. In either case, therefore, the output of the OR gate OR4 is in "H" level. This changes the output of NOR gate NR1 to "L" level causing an interrupt at the interrupt input terminal INTB.

At the same time the "L" level signal from the NAND gate NA is forbidden, and all interrupts to the interrupt input terminal INTA are prevented. Therefore, the microcomputer C cannot start when the main switch is opened or when the battery source voltage is below the predetermined voltage. The inverters IN-1–IN8 all act as pulldown resistance at this time thereby eliminating unnecessary power consumption.

Finally, the "motor step" subroutine for stopping the motor will be described.

This subroutine is executed when the motor M is rotating forward or backward. When the program moves to this subroutine, the output ports PO3 and PO4 are changed to "H" level first (Step 51).

This results in the control signals 16 and 17 input to the motor control circuit MC changing to "H" level, whereby the transistors Q1 and Q2 or Q3 and Q4 for driving the motor M stop operating. After waiting for longer than the time $t_0$ required for the transistors Q1 and Q2 or Q3 and Q4 to stop operating (Step 52), the output port PO7 is changed to "L" level. Thus, as hereinbefore described, variations are prevented from occurring in the source voltage by a short-circuiting current between the source and the grounding which would be caused by the "L" level motor control signal 112 input before the transistors Q1 and Q2 or Q3 and Q4 completely stop operating.

As a result, the signal 112 input to the motor braking input terminal B changes to "L" level whereby the motor is electrically braked. After waiting for the time required for the motor M to stop (Step 54), the output port PO7 is changed to "H" level (Step 55). Then, after waiting until the transistors Q2 and Q4 stop operating (Step 56), the program makes a return.

Figure 14A:
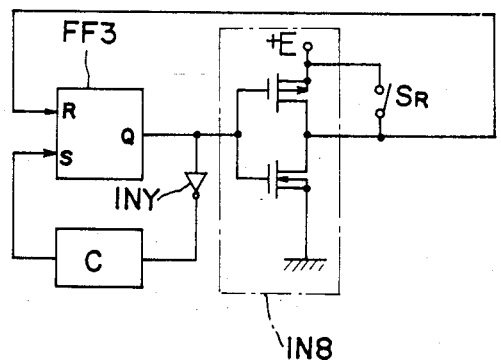
FIGS. 14A and 14B are views corresponding to FIG. 5 and showing a modified embodiment.
Figure 14B:
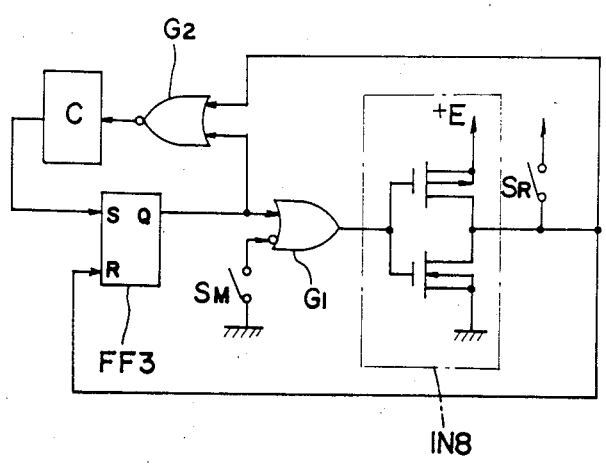
Figure 15A:
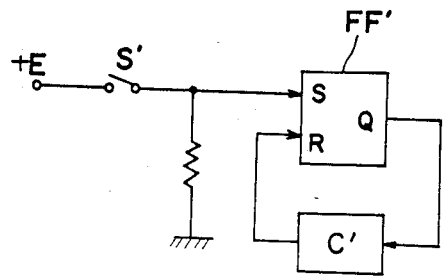
FIGS. 15A and 15B are views corresponding to FIG. 5 and showing prior art examples, respectively.
Figure 15B:
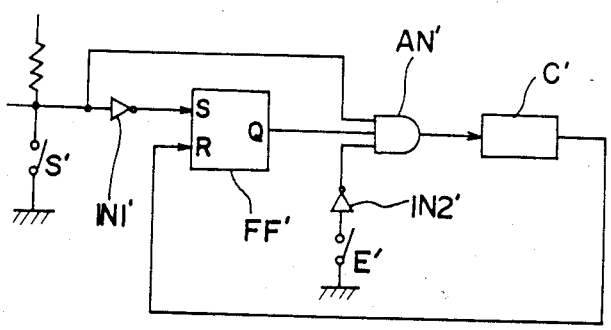

FIG. 14B shows a modification of the memory unit shown in FIG. 5B. In this memory unit, the back lid switch SR which is one example of set switch is connected in parallel with the MOSFET of P-channel of the C-MOS type inverter IN8 which is one example of switching means. In order for conformity of the entire logic, an output of this C-MOS type inverter IN8 is directly input to the reset input terminal R of the flip-flop FF3, the output of the microcomputer C is input to the set input terminal S of the flip-flop FF3, an OR gate is provided in place of the AND gate to act as cancellation means G1, and a NOR gate is provided in place of the AND gate to act as output means G2. The basic operation of this unit is the same as the principle of the preceding embodiment shown in FIG. 5.

Thus, when the back lid switch SR is open, the C-MOS type inverter IN8 acts as pulldown resistance. When the back lid switch SR is closed, the output of the C-MOS type inverter IN8 changes to "H" level and the flip-flop FF3 is reset. This state constitutes the second state of this system. Accordingly, the output of flip-flop FF3 changes to "L" level and an operation permitting signal is output. Further, since the output of OR gate G1 changes to "L" level and the C-MOS type inverter IN8 acts as pullup resistance, the MOSFET of P-channel turns "OFF" whereby no current flows through the back lid switch SR. The output of this inverter IN8 changes to "H" level which is maintained until the flip-flop FF3 is set, whether the back lid switch SR is opened or closed. In other words, the above action constitutes a positive feedback action of the C-MOS type inverter IN8 with respect to the closing action of the back lid switch SR, as in the case of the preceding embodiment. In this state, as in the preceding embodiment, the microcomputer C cannot start by the opening of the back lid switch SR.

When the main switch SM is closed, the output of OR gate G1 changes to "H" level. The output of the inverter IN8 is inverted to be in "L" level and, if the back lid switch SR is opened, the input to the NOR gate G2 changes to "L" level. The reset input terminal R of the flip-flop FF3 also changes to "L" level, but the output terminal Q of the flip-flop FF3 is maintained to be in "L" level to continue outputting the operation permission signal. Thus, the output of the NOR gate G2 changes to "H" level whereby the predetermined operation is carried out. In other words, the action for changing the input to inverter IN8 maintained in "L" level by the positive feedback, into "L" level by closing the main switch SM constitutes a cancellation action with respect to the positive feedback as in the preceding embodiment, and the OR gate G1 acts as the cancellation means.

The electric current flowing through the back lid switch SR during the above operation, similarly, is as illustrated in FIG. 6.

In short, it serves the purpose if the switching means IN8 and the set switch SR are interconnected such that the switching means IN8 performs the positive feedback function with respect to the set switch SR, and their arrangement on the circuitry is variable as appropriate. This applies also to the preceding memory unit.

In accordance with the above, the types of gates acting as the cancellation means G1 for the positive feedback and as the output means G2 relative to the operation means C are variable with the entire logic which may be positive or negative, and inverters may be provided as appropriate.

While in the foregoing embodiments the C-MOS type inverter is employed as the switching means IN8, the construction of this switching means IN8 may be varied as appropriate. For example, the MOSFET connected in parallel with the set switch SR may be replaced by a resistance having a sufficient resistance with respect to the ON resistance of the element connected in series to the set switch SR. Also, the element connected in series to the set switch SR may comprise, instead of the MOSFET, a combination of an ordinary transistor and a current restricting resistance having a resistance value substantially equal to the ON resistance (about 100 kΩ) of the MOSFET used in the described embodiment.

The described memory units consume minimum of power and have high utility particularly when applied to cameras and other battery-operated instruments in that small batteries are not sufficient for their operation and this permits compact designing and cost reduction of these instruments.

The present invention is applicable to an electronic still camera using a disk-shaped magnetic recording medium as well as an ordinary still camera using a film as in the foregoing embodiments. It should be noted that the disk-shaped magnetic recording medium is embraced by the concept of the term "film" used throughout this specification.

We claim:

1. A camera, comprising:
   a manually operable switch member;
   an electric power source;
   brightness measuring means for measuring brightness of an object to be photographed, wherein the brightness measuring means is responsive to the electric power source and generates an output signal;
   power supply control means for controlling electric power supplied by the electric power source, wherein the control means is responsive to operation of the switch member;
   exposure control means for controlling exposure of the camera in response to the output signal generated by the brightness measuring means;

film winding means for winding a film upon termination of an operation of the exposure control means;

film end detector means for detecting an end of the film;

film winding interrupting means for interrupting an operation of the film winding means upon detection of the end of the film by the film end detector means; and power supply interrupting means for interrupting electric power supplied to the brightness detecting means, wherein the power supply interrupting means interrupts the power supplied to the brightness detecting means when the end of the film is detected by the film end detector means even if the switch member is operated.

2. A camera as claimed in claim 1 wherein the film end detector means includes overload detector means for detecting an overload acting on the film winding means.

3. A camera as claimed in claim 2 wherein the film winding means includes drive means driven by a motor to wind the film, and the overload detector means includes time count means for starting a time count when the drive means starts film winding and reset means for resetting the time count when a predetermined amount of film is wound, wherein the overload detector means detects the overload when the time count exceeds a predetermined value.

4. A camera as claimed in claim 3 wherein the reset means resets the time count when the film is wound by an amount corresponding to one frame.

5. A camera, comprising:
a first manually operable switch member;
a second manually operable switch member;
photographing operation preparing means for performing a preparation for photographing operation in response to operation of the first switch member;
exposure control means for controlling exposure of the camera in response to operation of the second switch member;
film winding means for winding a film upon termination of exposure control operation of the exposure control means;
film end detector means for detecting an end of the film;
film winding interrupting means for interrupting operation of the film winding means upon detection of the end of the film; and
preparation interrupting means for interrupting the operation of the photographing operation preparing means upon detection of the end of the film by the film end detector means even if the first switch member is operated.

6. A camera as claimed in claim 5, wherein the photographing operation preparing means includes brightness measuring means for measuring brightness of an object to be photographed.

* * * * *